(12) United States Patent
Sharma et al.

(10) Patent No.: US 12,425,910 B2
(45) Date of Patent: Sep. 23, 2025

(54) MEASUREMENT GAPS FOR L1 MEASUREMENTS

(71) Applicant: QUALCOMM Incorporated, San Diego, CA (US)

(72) Inventors: Prashant Sharma, San Jose, CA (US); Changhwan Park, San Diego, CA (US); Muhammad Nazmul Islam, Littleton, MA (US); Jing Lei, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 526 days.

(21) Appl. No.: 18/047,905

(22) Filed: Oct. 19, 2022

(65) Prior Publication Data

US 2023/0130297 A1 Apr. 27, 2023

Related U.S. Application Data

(60) Provisional application No. 63/262,958, filed on Oct. 22, 2021.

(51) Int. Cl.
  *H04W 24/10* (2009.01)
  *H04W 56/00* (2009.01)

(52) U.S. Cl.
  CPC ......... *H04W 24/10* (2013.01); *H04W 56/001* (2013.01)

(58) Field of Classification Search
  CPC ... H04W 24/10; H04W 56/001; H04W 48/16; H04L 5/0048
  See application file for complete search history.

(56) References Cited

PUBLICATIONS

Huawei, Discussion on BWP Operation without Restriction (Year: 2022).*
3GPP TS 38.133, "3rd Generation Partnership Project, Technical Specification Group Radio Access Network, NR, Requirements for Support of Radio Resource Management (Release 17)", 3rd Generation Partnership Project, Mobile Competence Centre, 650, Route Des Lucioles, F-06921 Sophia-Antipolis Cedex, France, vol. RAN WG4, No. V17.3.0, Oct. 4, 2021, 2865 pages, XP052057111, pp. 67-546, p. 193, Sec 9, p. 204, Sec 9.1.2, Tables 9.1.2-1.

(Continued)

*Primary Examiner* — Ayanah S George
(74) *Attorney, Agent, or Firm* — Arent Fox, LLP

(57) ABSTRACT

This disclosure provides systems, methods and apparatus, including computer programs encoded on computer storage media for a user equipment (UE), which may include a reduced capability (RedCap) UE, and a supporting cell. The UE may receive a synchronization signal block (SSB). The UE may receive a configuration of an active downlink bandwidth part (BWP) that is not configured with a SSB. The UE may tune, from the active downlink BWP to a different frequency for a layer 1 (L1) measurement gap defined by a L1 measurement gap configuration. The UE may perform a L1 measurement of the SSB on the different frequency during the L1 measurement gap. The UE may be a RedCap UE, the active BWP may be for RedCap UEs, and the SSB may define an initial BWP for the RedCap UEs and non-RedCap UEs, and the different frequency may be the initial BWP.

30 Claims, 11 Drawing Sheets

(56) References Cited

PUBLICATIONS

Huawei, et al., "Discussion on BWP Operation Without Bandwidth Restriction", 3GPP TSG-RAN WG1 Meeting #109-e, R1-2204920, 3rd Generation Partnership Project, Mobile Competence Centre, 650, Route Des Lucioles, F-06921 Sophia-Antipolis Cedex, France, vol. RAN WG1, No. e-Meeting, May 9, 2022-May 20, 2022, Apr. 25, 2022, XP052138256, 3 pages.
International Search Report and Written Opinion—PCT/US2022/078442—ISA/EPO—Jan. 24, 2023.
Nokia, et al., "Bandwidth Reduction for Reduced Capability Devices", 3GPP TSG RAN WG1 Meeting #106bis-e, R1-2109310, 3rd Generation Partnership Project, Mobile Competence Centre, 650, Route Des Lucioles, F-06921 Sophia-Antipolis Cedex, France, vol. RAN WG1, No. e-Meeting, Oct. 11, 2021-Oct. 19, 2021, Oct. 1, 2021, XP052058264, 7 pages.
Qualcomm Incorporated: "BW Reduction for RedCap UE", 3GPP TSG-RAN WG1 Meeting #106, R1-2107351, 3GPP, Mobile Competence Centre, 650, Route Des Lucioles, F-06921 Sophia-Antipolis Cedex, France, vol. RAN WG1, No. e-Meeting, Aug. 16, 2021-Aug. 27, 2021, Aug. 7, 2021, 24 pages, XP052038299, Sec 2.1, p. 1-2, Proposal 4, p. 4 Sec 2.2, p. 6-7 Sec 2.3, p. 8-9 Proposal 27, p. 20, Sec 1, 2.1.1, 2.2, 2.3, p. 1-10, p. 2, Sec 2.1.2, p. 9, Sec 2.3, fig 7, the whole document.
ZTE, et al., "Bandwidth Reduction for Reduced Capability NR Devices", 3GPP TSG RAN WG1 #106bis-e, R1-2109332, 3rd Generation Partnership Project, Mobile Competence Centre, 650, Route Des Lucioles, F-06921 Sophia-Antipolis Cedex, France, vol. RAN WG1, No. e-Meeting, Oct. 11, 2021-Oct. 19, 2021, Oct. 2, 2021, XP052058285, 7 pages.

\* cited by examiner

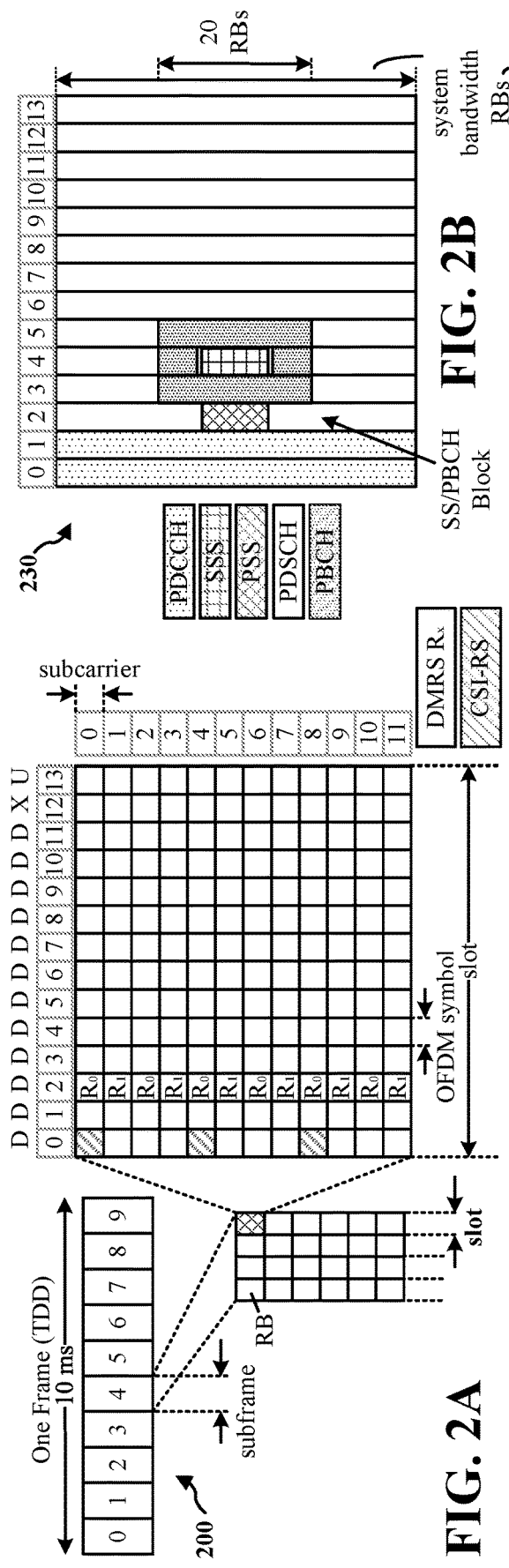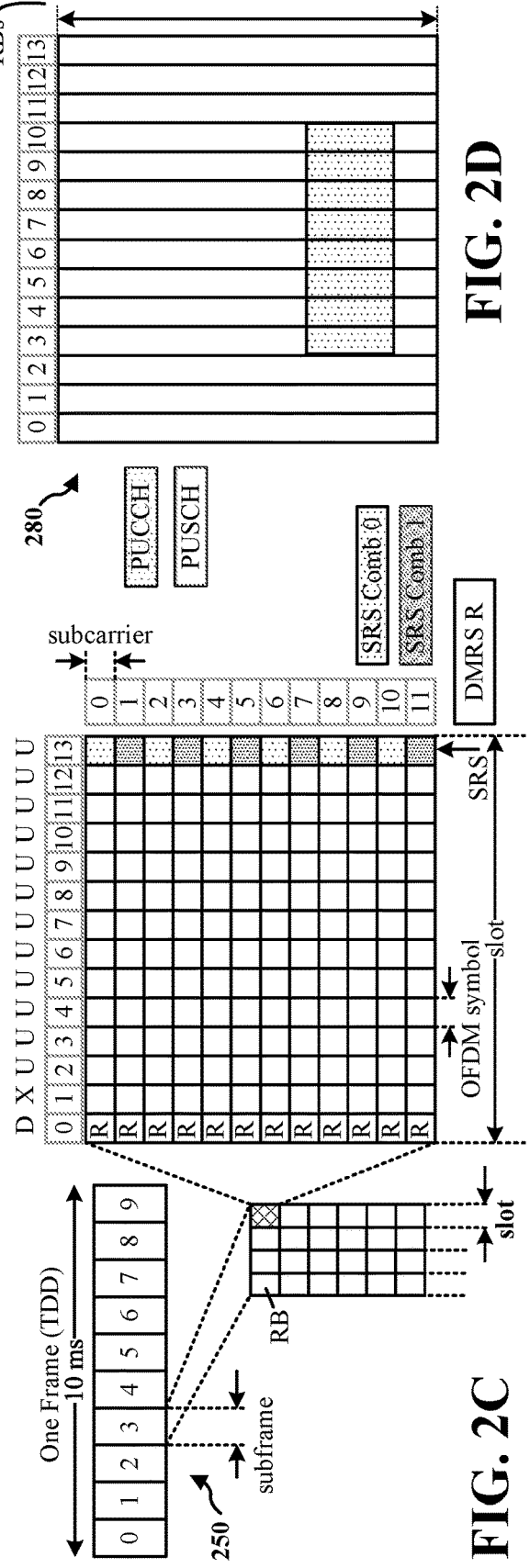

MEASUREMENT GAPS FOR L1 MEASUREMENTS

CROSS-REFERENCE TO RELATED APPLICATIONS

This application claims priority to U.S. Provisional Application No. 63/262,958 titled "MEASUREMENT GAPS FOR L1 MEASUREMENTS," filed Oct. 22, 2021, which is assigned to the assignee hereof, and incorporated herein by reference in its entirety.

TECHNICAL FIELD

The present disclosure relates to wireless communications including measurement gaps for L1 measurements.

DESCRIPTION OF THE RELATED TECHNOLOGY

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (such as with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard.

SUMMARY

The systems, methods and devices of this disclosure each have several innovative aspects, no single one of which is solely responsible for the desirable attributes disclosed herein.

One innovative aspect of the subject matter described in this disclosure can be implemented in a method for performing L1 measurements on a device, which may be a reduced capability (RedCap) device. Although the techniques and methods in this disclosure are described with respect to RedCap user equipment (UE), they may also apply to non-RedCap UEs as well. The method includes receiving a synchronization signal block (SSB). The method includes receiving a configuration of an active downlink bandwidth part (BWP) that is not configured with a SSB. The method includes tuning, from the active downlink BWP to another frequency during a layer 1 (L1) measurement gap defined by a L1 measurement gap configuration. The method includes performing a L1 measurement of the SSB during the L1 measurement gap.

The present disclosure also provides an apparatus (e.g., a UE) including a memory storing computer-executable instructions and at least one processor configured to execute the computer-executable instructions to perform at least one of the above methods, an apparatus including means for performing at least one of the above methods, and a non-transitory computer-readable medium storing computer-executable instructions for performing at least one of the above methods.

One innovative aspect of the subject matter described in this disclosure can be implemented in a method of supporting a UE such as a RedCap UE. The method includes transmitting a synchronization signal block (SSB). The method includes transmitting, to at least one UE, a configuration of an active downlink BWP that is not configured with a SSB. The method includes transmitting, to the at least one UE, a layer 1 (L1) measurement gap configuration defining a L1 measurement gap during which the at least one UE is to perform a L1 measurement of the SSB outside of the active downlink BWP.

The present disclosure also provides an apparatus (e.g., a BS) including a memory storing computer-executable instructions and at least one processor configured to execute the computer-executable instructions to perform at least one of the above methods, an apparatus including means for performing at least one of the above methods, and a non-transitory computer-readable medium storing computer-executable instructions for performing at least one of the above methods.

Details of one or more implementations of the subject matter described in this disclosure are set forth in the accompanying drawings and the description below. Other features, aspects, and advantages will become apparent from the description, the drawings and the claims. Note that the relative dimensions of the following figures may not be drawn to scale.

BRIEF DESCRIPTION OF THE DRAWINGS

FIG. 2A is a diagram illustrating an example of a first frame.

FIG. 2B is a diagram illustrating an example of DL channels within a subframe.

FIG. 2C is a diagram illustrating an example of a second frame.

FIG. 2D is a diagram illustrating an example of a subframe.

Like reference numbers and designations in the various drawings indicate like elements.

DETAILED DESCRIPTION

Figure 1:
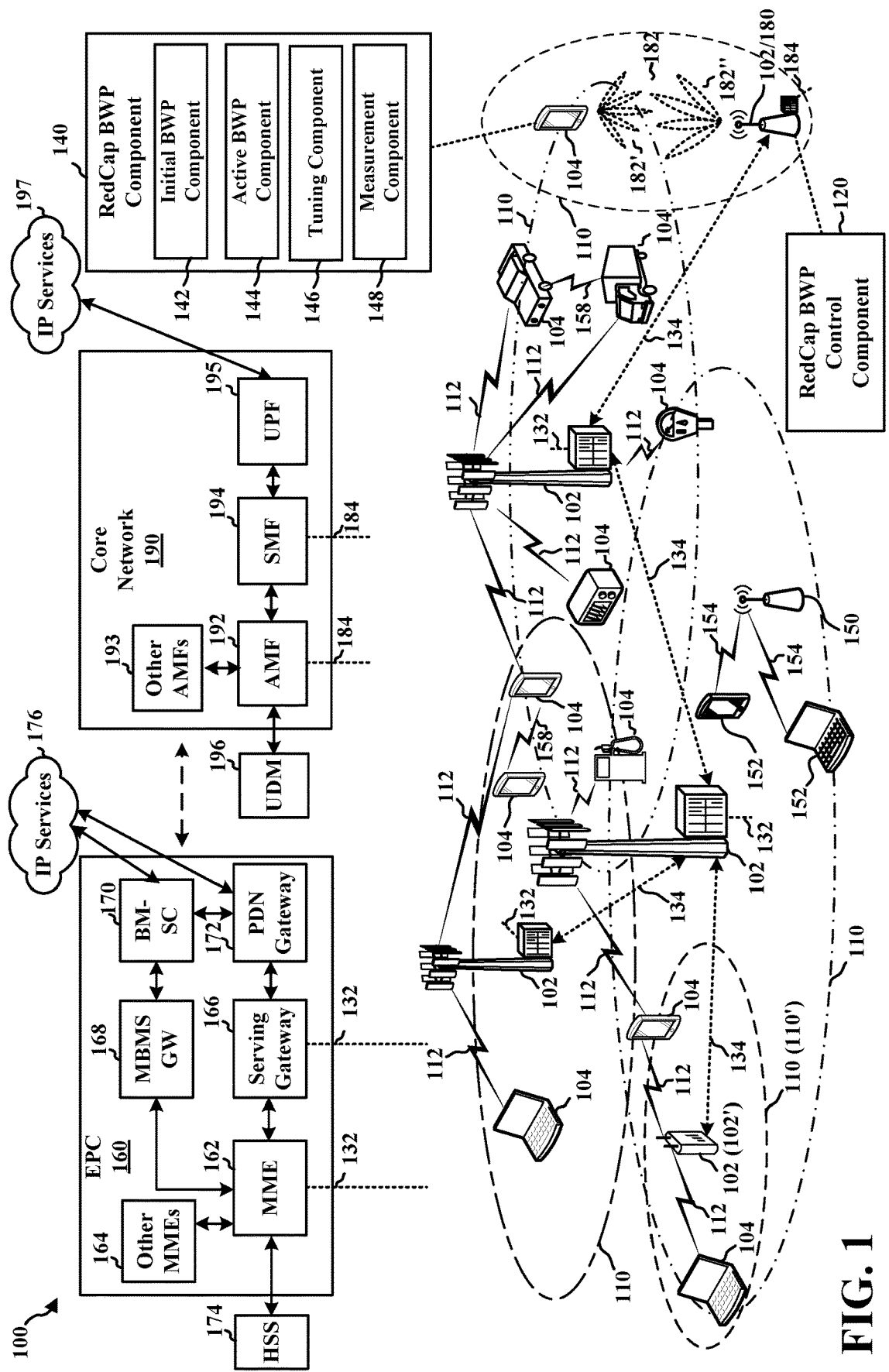
FIG. 1 is a diagram illustrating an example of a wireless communications system including an access network.

The following description is directed to certain implementations for the purposes of describing the innovative aspects of this disclosure. However, a person having ordinary skill in the art will readily recognize that the teachings herein can be applied in a multitude of different ways. Some of the examples in this disclosure are based on wireless and wired local area network (LAN) communication according to the Institute of Electrical and Electronics Engineers (IEEE) 802.11 wireless standards, the IEEE 802.3 Ethernet standards, and the IEEE 1901 Powerline communication (PLC) standards. However, the described implementations may be implemented in any device, system or network that is capable of transmitting and receiving RF signals according to any of the wireless communication standards, including any of the IEEE 802.11 standards, the Bluetooth® standard, code division multiple access (CDMA), frequency division multiple access (FDMA), time division multiple access (TDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1×EV-DO, EV-DO Rev A, EV-DO Rev B, High Speed Packet Access (HSPA), High Speed Downlink Packet Access (HSDPA), High Speed Uplink Packet Access (HSUPA), Evolved High Speed Packet Access (HSPA+), Long Term Evolution (LTE), AMPS, or other known signals that are used to communicate within a wireless, cellular or internet of things (IOT) network, such as a system utilizing 3G, 4G or 5G, or further implementations thereof, technology.

A user equipment (UE) may utilize a subset of total cell bandwidth of a cell referred to as a Bandwidth Part (BWP). For example, in 5G NR releases 15 and 16, a maximum BWP size is 100 MHz. In higher frequency ranges (e.g., FR 2), the size of bandwidth parts may increase. Such large bandwidths may be designed to satisfy the demands of premium smartphones utilizing enhanced mobile broadband (eMBB) and other use cases such as ultra-reliable low latency communication (URLLC) and vehicle to anything (V2X). For some devices, referred to as reduced capability or RedCap devices, the maximum size of a BWP may be reduced to provide power saving and reduced complexity. That is, a first type of UE be capable of using a BWP of the maximum BWP size, whereas a RedCap UE may be a second type of UE that has lower maximum BWP size than the first type of UE for a frequency range. Example RedCap devices may include wearables, industrial wireless sensor networks (IWSN), surveillance cameras, and low-end smartphones. In some cases, data rates for RedCap devices may be achieved with BWP sizes less than 100 MHz. In an example implementation, in FR1, a maximum device bandwidth for a non-RedCap device may be 100 MHz, while the maximum device bandwidth for a RedCap device may be 20 MHz. In FR2, the maximum device bandwidth for a non-RedCap device may be 200 MHz, while the maximum device bandwidth for a RedCap device may be 100 MHz. Other maximum device bandwidths may be applicable in other implementations. Although the techniques and methods described in this disclosure are described with respect to RedCap UEs, they may also apply to non-RedCap UEs as well.

RedCap devices may coexist with non-RedCap devices on the same cells. The reduced bandwidth of RedCap devices may, however, may be incompatible with some system configurations. For example, a physical uplink control channel (PUCCH) is typically allocated at the edges of an uplink BWP to allow contiguous physical uplink shared channel (PUSCH) transmissions and random access channel (RACH) transmissions near the center of the uplink BWP. Broadcast signaling for initial access (e.g., channel raster and synchronization signal blocks (SSBs)) are typically transmitted near the middle of the downlink BWP. Accordingly, a RedCap UE with a reduced BWP size may not be able to transmit on the PUCCH and receive SSBs. One proposal to accommodate RedCap UEs is to provide a separate initial BWP for RedCap devices that carries downlink signaling. The separate initial BWP for RedCap devices may be located near the edge of carrier bandwidth such that the PUCCH resources overlap with the PUCCH resources for non-RedCap devices. In some proposals, an active BWP may also be configured for RedCap devices. Multiple BWPs may provide flexibility for RedCap devices, but raise additional issues for signaling and measurements. Broadly, a RedCap UE may monitor one BWP at a time, but signaling and reference signals may occur on different BWPs. For example, an active downlink BWP for RedCap devices may not be configured with a SSB for the RedCap devices to use for L1 measurements.

In an aspect, the present disclosure provides for measurement gaps that allow a RedCap UE to tune away from an active BWP to an initial BWP configured with a SSB for L1 measurements. The RedCap UE may receive cell-defining SSBs (CD-SSBs) on a shared initial BWP that is applicable to both RedCap UEs and non-RedCap UEs. CD-SSBs refer to the set of SSBs that are located at synchronization points. Hence, CD-SSBs can be detected by UEs that are performing initial access. The RedCap UE may receive non-CD SSBs on a separate initial BWP for RedCap UEs. Non-CD-SSBs are not located at raster points. The UE knows the location of the Non-CD-SSBs only after being connected to the network (e.g., the shared initial BWP). Both the shared initial BWP and the separate initial BWP may be referred to as an initial BWP. Additionally, CD-SSBs and non-CD-SSBs may be generically referred to as SSBs. The RedCap UE may additionally be configured with an active BWP for RedCap UEs that may not be configured with an SSB. Accordingly, the RedCap UE may not be able to perform L1 measurements on the active BWP for RedCap UEs.

The RedCap UE may be configured with a L1 measurement gap for performing L1 measurements on an initial BWP configured with a SSB. The RedCap UE may be configured with L1 measurement resources (e.g., specific SSBs identified by an SSB index). The RedCap UE may tune away from the active BWP to the initial BWP to perform L1 measurements on the SSBs. For example, the RedCap UE may measure one or both of the CD-SSBs on the shared initial downlink BWP and the non-CD-SSBs on the separate initial downlink BWP. The RedCap UE may tune back to the active BWP during the L1 measurement gap. Additionally, the configuration of the active BWP may indicate a measurement resource (e.g., for layer 3 measurements) on any of the shared initial BWP, the separate initial BWP, or the active BWP and measurement gaps on the active BWP. The L1 measurement gap may have a shorter measurement gap length (MGL) and/or shorter measurement gap repetition period (MGRP) than L3 measurement gaps. In some cases, the L1 measurement gaps may overlap with the L3 measurement gaps. The RedCap UE may perform L1 and L3 measurements concurrently for intra-frequency measurements, or utilize measurement gap sharing with a multi-level sharing factor for inter-frequency and inter-Radio Access Technology (RAT) measurements. Accordingly, a RedCap UE may perform L1 measurements despite a lack of an SSB transmitted on an active BWP configured for the RedCap UE.

Particular implementations of the subject matter described in this disclosure can be implemented to realize one or more of the following potential advantages. RedCap devices may use a narrower bandwidth, which may save power, while co-existing on the same carrier bandwidth with non-RedCap UEs. The L1 measurements may allow the UE to perform operations such as radio link monitoring (RLM), beam failure detection (BFD), and candidate beam detection (CBD) for efficient use of wireless resources.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. The processor may include an interface or be coupled to an interface that can obtain or output signals. The processor may obtain signals via the interface and output signals via the interface. In some implementations, the interface may be a printed circuit board (PCB) transmission line. In some other implementations, the interface may include a wireless transmitter, a wireless transceiver, or a combination thereof. For example, the interface may include a radio frequency (RF) transceiver which can be implemented to receive or transmit signals, or both. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example implementations, the functions described may be implemented in hardware, software, or any combination thereof. If implemented in software, the functions may be stored on or encoded as one or more instructions or code on a computer-readable medium. Computer-readable media includes computer storage media, which may be referred to as non-transitory computer-readable media. Non-transitory computer-readable media may exclude transitory signals. Storage media may be any available media that can be accessed by a computer. By way of example, and not limitation, such computer-readable media can include a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (such as a 5G Core (5GC)). The base stations 102 may include macrocells (high power cellular base station) or small cells (low power cellular base station). The macrocells include base stations. The small cells include femtocells, picocells, and microcells. The small cells include femtocells, picocells, and microcells. The base stations 102 can be configured in a Disaggregated RAN (D-RAN) or Open RAN (O-RAN) architecture, where functionality is split between multiple units such as a central unit (CU), one or more distributed units (DUs), or a radio unit (RU). Such architectures may be configured to utilize a protocol stack that is logically split between one or more units (such as one or more CUs and one or more DUs). In some aspects, the CUs may be implemented within an edge RAN node, and in some aspects, one or more DUs may be co-located with a CU, or may be geographically distributed throughout one or multiple RAN nodes. The DUs may be implemented to communicate with one or more RUs.

In some implementations, one or more of the UEs 104 may include a RedCap BWP component 140 that manages multiple BWPs for a RedCap UE. The RedCap BWP component 140 may include an initial BWP component 142 configured to receive a SSB that defines an initial downlink BWP for RedCap UEs and non-RedCap UEs. The RedCap BWP component 140 may include an active BWP component 144 configured to receive a configuration of an active downlink BWP for RedCap UEs that is not configured with a SSB. The RedCap BWP component 140 may include a tuning component 146 configured to tune, from the active downlink BWP for RedCap UEs to the initial downlink BWP for a L1 measurement gap defined by a L1 measurement gap configuration. The RedCap BWP component 140 may include a measurement component 148 configured to performing a L1 measurement of the SSB on the initial downlink BWP during the L1 measurement gap.

Figure 8:
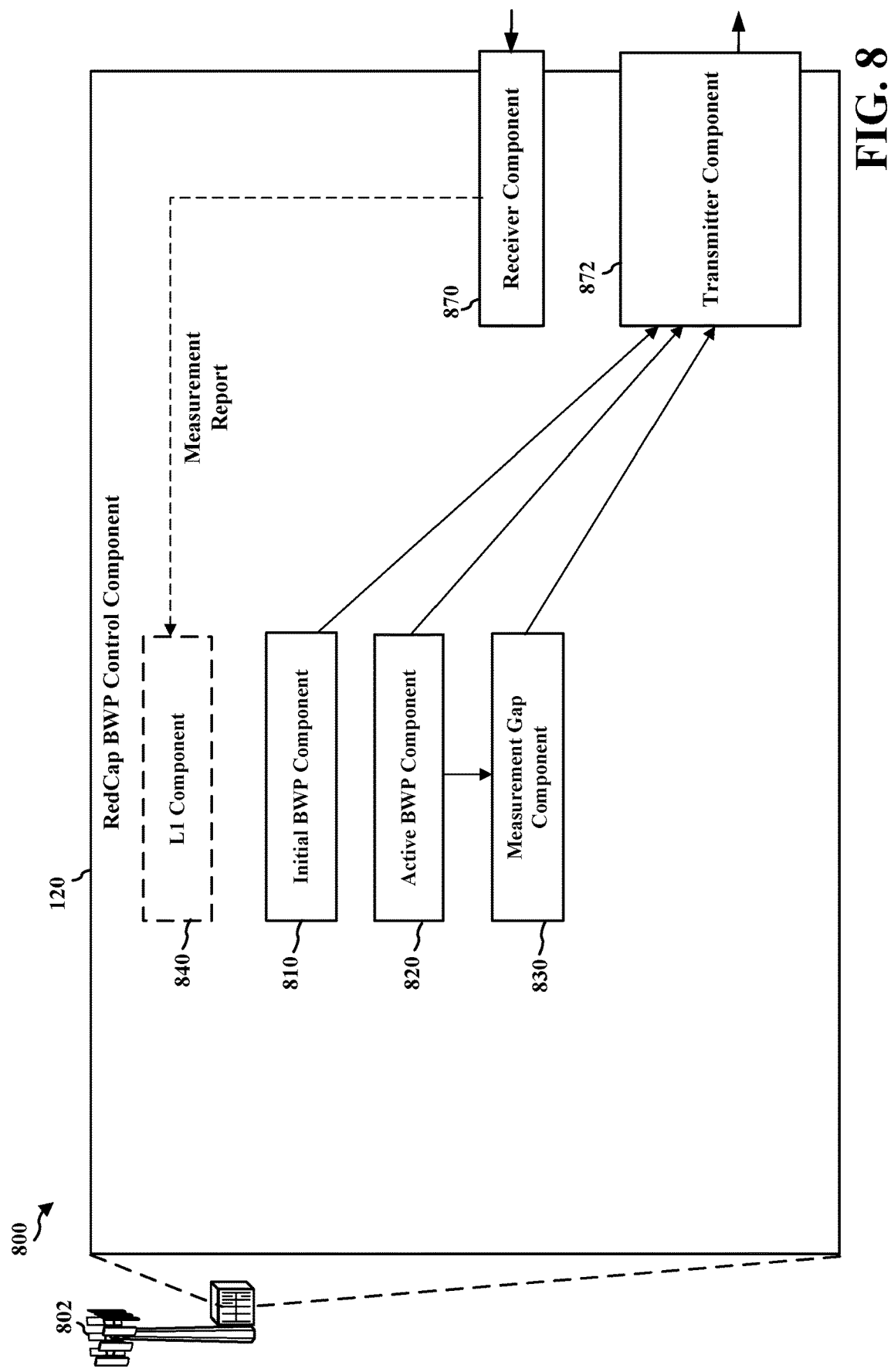
FIG. 8 is a conceptual data flow diagram illustrating the data flow between different means/components in an example BS.

In some implementations, one or more of the base stations 102 may include a RedCap BWP control component 120 configured to manage multiple BWPs for RedCap UEs. As illustrated in FIG. 8, the RedCap BWP control component 120 may include an initial BWP component 810 configured to transmit a SSB that defines an initial downlink BWP for RedCap UEs and non-RedCap UEs. The RedCap BWP control component 120 may include an active BWP component 820 configured to transmit, to at least one RedCap UE, a configuration of an active downlink BWP for RedCap UEs that is not configured with a SSB. The RedCap BWP control component 120 may include measurement gap component 830 configured to transmit, to the at least one RedCap UE, a layer 1 (L1) measurement gap configuration defining a L1 measurement gap during which the at least one RedCap UE is to perform a L1 measurement of the SSB on the initial downlink BWP.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (such as Si interface), which may be wired or wireless. The base stations 102 configured for 5G NR (collectively referred to as Next Generation RAN (NG-RAN)) may interface with core network 190 through second backhaul links 184, which may be wired or wireless. In addition to other functions, the base stations 102 may perform one or more of the following functions: transfer of user data, radio channel ciphering and deciphering, integrity protection, header compression, mobility control functions (such as handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (such as through the EPC 160 or core network 190) with each other over third backhaul links 134 (such as X2 interface). The third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network also may include Home Evolved Node Bs (eNBs) (HeNBs), which may provide service to a restricted group known as a closed subscriber group (CSG). The communication links 112 between the base stations 102 and the UEs 104 may include UL (also referred to as reverse link) transmissions from a UE 104 to a base station 102 or DL (also referred to as forward link) transmissions from a base station 102 to a UE 104. The communication links 112 may use multiple-input and multiple-output (MIMO) antenna technology, including spatial multiplexing, beamforming, or transmit diversity. The communication links may be through one or more carriers. The base stations 102/UEs 104 may use spectrum up to Y MHz (such as 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (such as more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to or increase capacity of the access network.

A base station 102, whether a small cell 102' or a large cell (such as macro base station), may include an eNB, gNodeB (gNB), or other type of base station. Some base stations, such as gNB 180 may operate in one or more frequency bands within the electromagnetic spectrum.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" (mmW) band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band. Communications using the mmW radio frequency band have extremely high path loss and a short range. The mmW base station 180 may utilize beamforming 182 with the UE 104 to compensate for the path loss and short range.

The EPC 160 may include a Mobility Management Entity (MME) 162, other MMEs 164, a Serving Gateway 166, a Multimedia Broadcast Multicast Service (MBMS) Gateway

168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, or other IP services.

The base station may include or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (such as a MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (such as a parking meter, gas pump, toaster, vehicles, heart monitor, etc.). The UE 104 also may be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Although the following description may be focused on 5G NR, the concepts described herein may be applicable to other similar areas, such as LTE, LTE-A, CDMA, GSM, and other wireless technologies including future 6G technologies.

FIG. 2A is a diagram 200 illustrating an example of a first frame. FIG. 2B is a diagram 230 illustrating an example of DL channels within a subframe. FIG. 2C is a diagram 250 illustrating an example of a second frame. FIG. 2D is a diagram 280 illustrating an example of a subframe. The 5G NR frame structure may be FDD in which for a particular set of subcarriers (carrier system bandwidth), subframes within the set of subcarriers are dedicated for either DL or UL, or may be TDD in which for a particular set of subcarriers (carrier system bandwidth), subframes within the set of subcarriers are dedicated for both DL and UL. A subset of the total cell bandwidth of a cell is referred to as a Bandwidth Part (BWP) and bandwidth adaptation is achieved by configuring the UE with BWP(s) and telling the UE which of the configured BWPs is currently the active one. In an aspect, a narrow bandwidth part (NBWP) refers to a BWP having a bandwidth less than or equal to a maximum configurable bandwidth of a BWP. The bandwidth of the NBWP is less than the carrier system bandwidth.

In the examples provided by FIGS. 2A, 2C, the 5G NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

Other wireless communication technologies may have a different frame structure or different channels. A frame (10 milliseconds (ms)) may be divided into 10 equally sized subframes (1 ms). Each subframe may include one or more time slots. Subframes also may include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies $\mu$ 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2^\mu$ slots/subframe. The subcarrier spacing and symbol length/duration are a function of the numerology. The subcarrier spacing may be equal to $2^\mu * 15$ kHz, where $\mu$ is the numerology 0 to 5. As such, the numerology $\mu=0$ has a subcarrier spacing of 15 kHz and the numerology $\mu=5$ has a subcarrier spacing of 480 kHz. The symbol length/duration is inversely related to the subcarrier spacing. FIGS. 2A-2D provide an example of slot configuration 0 with 14 symbols per slot and numerology μ=2 with 4 slots per subframe. The slot duration is 0.25 ms, the subcarrier spacing is 60 kHz, and the symbol duration is approximately 16.67 microseconds (μs).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_x$ for one particular configuration, where 100x is the port number, but other DM-RS configurations are possible) and channel state information reference signals (CSI-RS) for channel estimation at the UE. The RS also may include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a L1 identity. A secondary synchronization signal (SSS) may be within symbol 4 of particular subframes of a frame. The SSS is used by a UE to determine a L1 cell identity group number and radio frame timing. Based on the L1 identity and the L1 cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block (SSB). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), or UCI.

Figure 3:
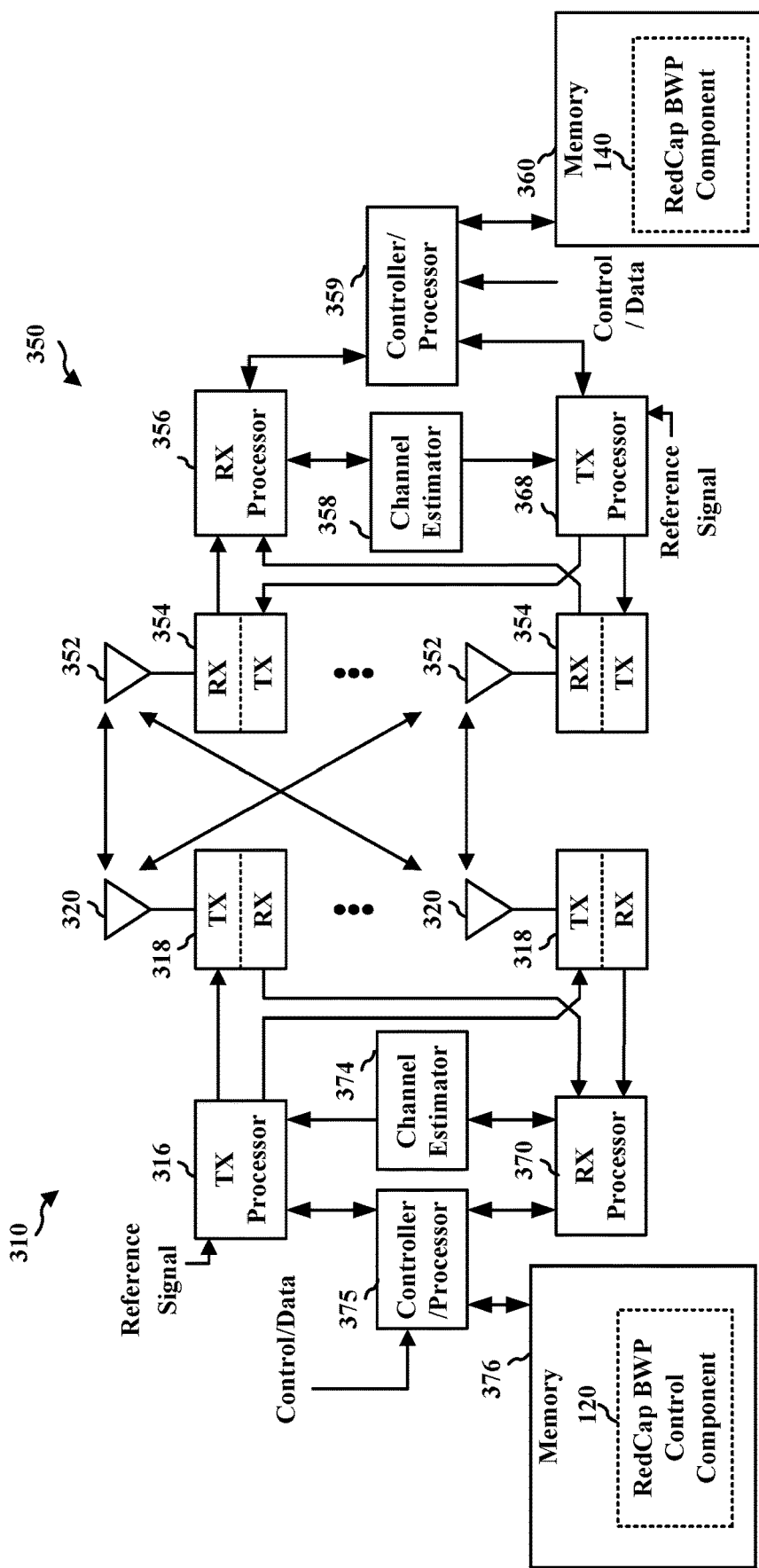
FIG. 3 is a diagram illustrating an example of a base station (BS) and user equipment (UE) in an access network.

FIG. 3 is a diagram of an example of a base station 310 and a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (such as MIB, SIBs), RRC connection control (such as RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TB s), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (such as binary phase-shift keying (BPSK), quadrature phase-shift keying (QPSK), M-phase-shift keying (M-PSK), M-quadrature amplitude modulation (M-QAM)). The coded and modulated symbols may be split into parallel streams. Each stream may be mapped to an OFDM subcarrier, multiplexed with a reference signal (such as a pilot) in the time or frequency domain, and combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal or channel condition feedback transmitted by the UE 350. Each spatial stream may be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 converts the OFDM symbol stream from the time-domain to the frequency domain using a Fast Fourier Transform (FFT). The frequency domain signal includes a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are decoded and deinterleaved to recover the data and control signals that were originally transmitted by the base station 310 on the physical channel. The data and control signals are provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK or NACK protocol to support HARQ operations.

Similar to the functionality described in connection with the DL transmission by the base station 310, the controller/processor 359 provides RRC layer functionality associated with system information (such as MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK or NACK protocol to support HARQ operations.

At least one of the TX processor 368, the RX processor 356, and the controller/processor 359 may be configured to perform aspects in connection with the RedCap BWP component 140 of FIG. 1. For example, the memory 360 may include executable instructions defining the RedCap BWP component 140. The TX processor 368, the RX processor 356, and/or the controller/processor 359 may be configured to execute the RedCap BWP component 140.

At least one of the TX processor 316, the RX processor 370, and the controller/processor 375 may be configured to perform aspects in connection with the RedCap BWP control component 120 of FIG. 1. For example, the memory 376 may include executable instructions defining the RedCap BWP control component 120. The TX processor 316, the RX processor 370, and/or the controller/processor 375 may be configured to execute the RedCap BWP control component 120.

Figure 4:
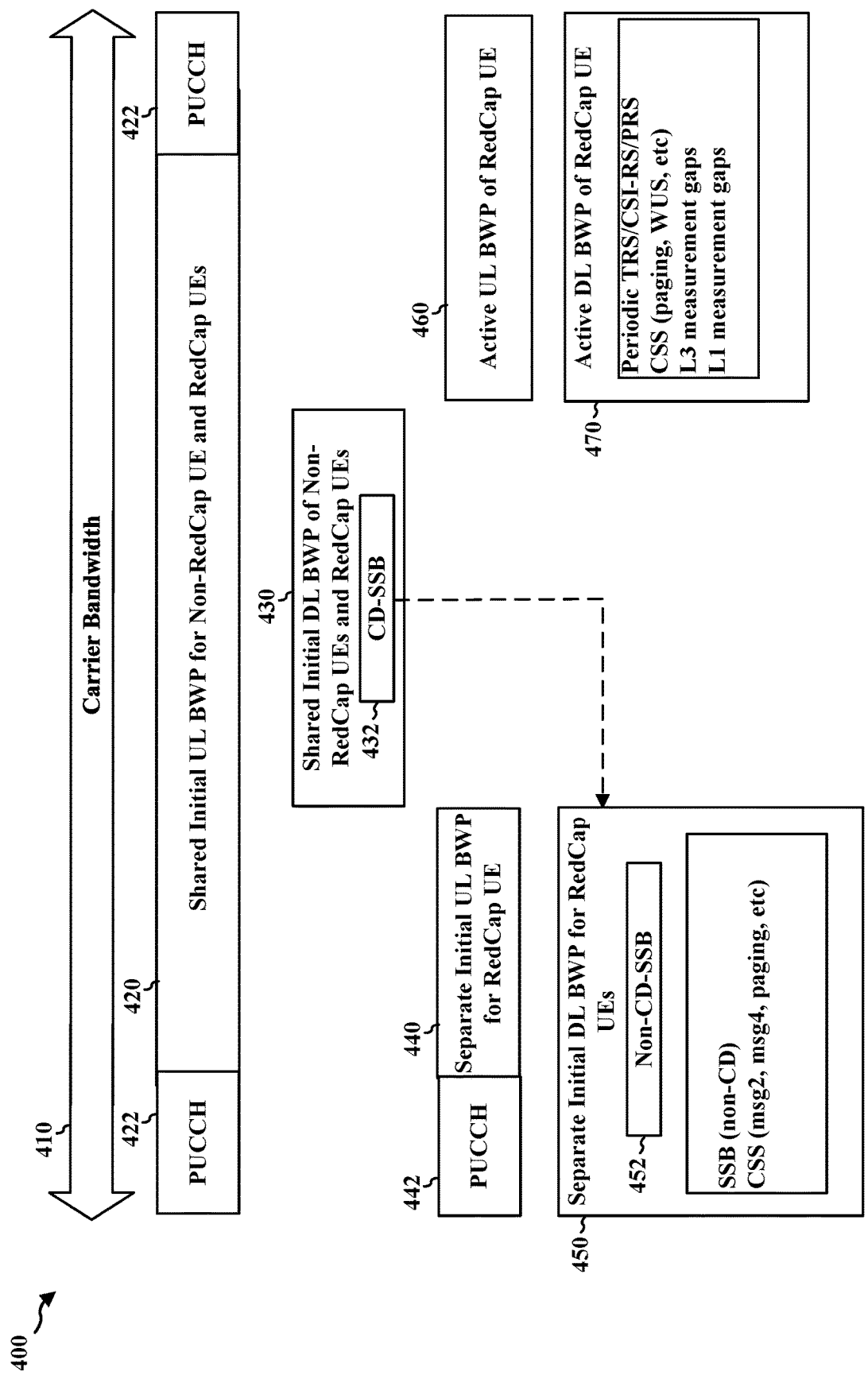
FIG. 4 is a diagram illustrating an example of a cell configuration including separate initial bandwidth parts (BWPs) and active BWPs for reduced capability (RedCap) UEs.

FIG. 4 is a diagram illustrating an example of a configuration 400 of multiple BWPs for a RedCap UE on a carrier bandwidth 410. The carrier bandwidth 410 may be, for example, a maximum system bandwidth. For instance, in 5G NR FR1, the maximum system bandwidth may be 100 MHz. A cell may be configured with a shared initial UL BWP 420 and a shared initial DL BWP 430. The shared initial UL BWP 420 and the shared initial DL BWP 430 may be used by both RedCap UEs and non-RedCap UEs. A non-RedCap UE or baseline device may refer to a first type of UE capable of using a BWP of a maximum BWP size, whereas a RedCap UE may refer a second type of UE that has lower maximum BWP size than the first type of UE for a frequency range. Descriptions here of a non-RedCap UE and a RedCap UE may be equally applicable the first type of UE and the second type of UE.

The differences between the first type of UE (e.g., non-RedCap UE) and the second type of UE (e.g., RedCap UE) may result in different usage of the shared initial UL BWP 420 and the shared initial DL BWP 430. In particular, the non-RedCap UEs may continue to use the shared initial UL BWP 420 and the shared initial DL BWP 430 as the initial BWPs after cell acquisition. For instance, a maximum BWP size for the non-RedCap UEs may be greater than or equal to the sizes of the shared initial UL BWP 420 and the shared initial DL BWP 430. In contrast, the maximum BWP size for the RedCap UEs may be less than the size of the shared initial UL BWP 420 and/or the size of the shared initial DL BWP 430. For instance, the RedCap UEs may be unable to communicate on a portion of the shared initial UL BWP 420 and/or the size of the shared initial DL BWP 430. For example, the shared initial UL BWP 420 may include PUCCH resource 422 configured at the edges of the carrier bandwidth 410 and the shared initial DL BWP 430 may carry CD-SSBs 432 near a center of the carrier bandwidth 410. The CD-SSBs 432 may be transmitted according to a channel raster such that the shared initial DL BWP 430 may be located during a cell search. As such, the CD-SSBs 432 define the cell. In an aspect, the RedCap UEs may receive a portion of the initial DL BWP 430 carrying the CD-SSBs 432 (e.g., an initial control resource set (CORESET)), but may not be able to transmit on the PUCCH resource 422 of the shared initial UL BWP 420.

In an aspect, the CD-SSBs 432 include or identify system information for a separate initial DL BWP 450 for RedCap UEs. The separate initial DL BWP 450 may carry non-CD-SSBs 452. The non-CD-SSBs 452 may carry some or all of the information for the cell and information for the separate initial DL BWP 450. The non-CD-SSBs 452 may include information for a separate UL BWP 440 for RedCap UEs. The separate UL BWP 440 may be located at an edge of the carrier bandwidth 410 and include PUCCH resource 442 that overlap the with PUCCH resource 422 of the shared initial UL BWP 420. A RedCap UE 104 may connect to the cell via the separate initial DL BWP 450 and the separate initial UL BWP 440. For instance, the RedCap UE 104 may receive the non-CD-SSBs 452 to obtain system information and perform measurements. The RedCap UE 104 may perform a random access procedure on the separate initial UL BWP 440. For instance, the separate initial UL BWP 440 may include physical random access channel (PRACH) occasions for transmitting an initial random access message. The separate initial DL BWP 450 may include a common search space for receiving subsequent random access message.

Once a RedCap UE 104 has accessed the cell, the network may configure the RedCap UE 104 with an active UL BWP 460 for RedCap UEs and an active DL BWP 470 for RedCap UEs. The active DL BWP 470 may be outside of the shared initial DL BWP 430 and/or the separate initial DL BWP 450. In an aspect, the active DL BWP 470 may be configured with signaling to facilitate operation of a RedCap UE. For example, the active DL BWP 470 may carry periodic reference signals such as a tracking reference signal (TRS), channel state information reference signal (CSI-RS), and/or positioning reference signal (PRS). The active DL BWP 470 may include a common search space (CSS) for paging and wake-up signal (WUS). The active DL BWP 470 may include dedicated RRC signaling for system information updates if a paging search space is not configured. The active DL BWP 470 may include layer 3 intra-frequency measurement gaps for measuring neighbor cells and/or reference signals on other BWPs (e.g., the shared initial DL BWP 430 and/or the separate initial DL BWP 450). In an aspect, the active DL BWP 470 may be configured with a separate layer 1 (L1) measurement gap configuration. The L1 measurement gap configuration may have a shorter MGL or MGRP than the layer 3 measurement gaps. For example, the Red-Cap UE 104 may measure a single instance of an SSB per measurement resource during each L1 measurement gap. The shorter MGRP may allow the RedCap UE 104 to perform L1 measurements more frequently.

Figure 5:
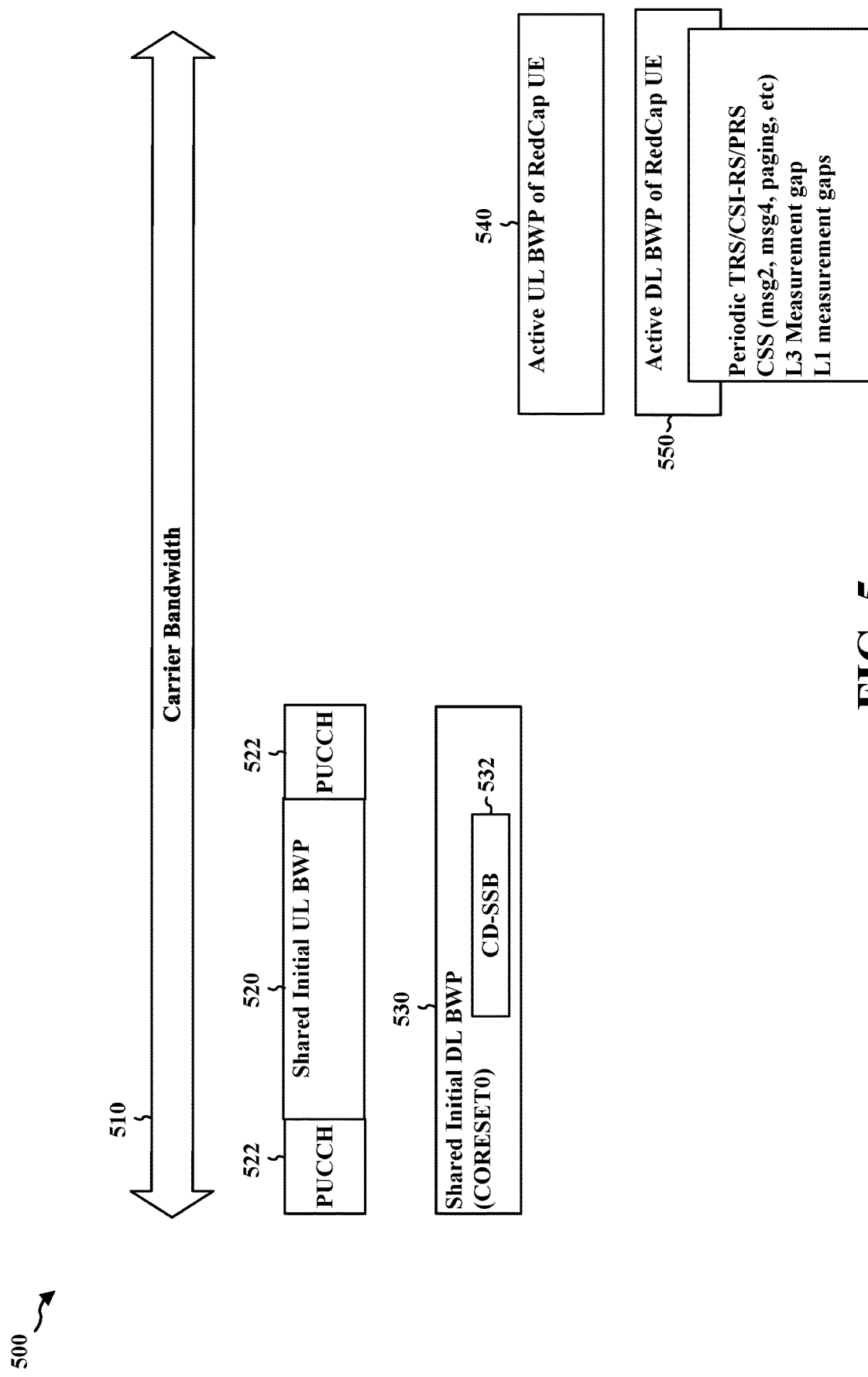
FIG. 5 is a diagram illustrating another example of a cell configuration including active BWPs for reduced capability (RedCap) UEs.

FIG. 5 is a diagram illustrating another example of a configuration 500 of multiple BWPs for a RedCap UE on a carrier bandwidth 510. Similar to the configuration 400, the configuration 500 may include a shared initial UL BWP 520 and a shared initial DL BWP 530 that may be used by both a first type of UE (e.g., non-RedCap UEs) and a second type of UE (e.g., RedCap UEs). The shared initial UL BWP 520 may include PUCCH resources 522 located at the edges of the shared initial UL BWP 520. The shared initial DL BWP 530 may include a CORESET0 carrying CD-SSBs 532.

The RedCap UE 104 may access the cell via the shared initial DL BWP 530. The network may configure the Red-Cap UE 104 with an active UL BWP 540 for RedCap UEs and an active DL BWP 550 for RedCap UEs. The active DL BWP 470 may be outside of the shared initial DL BWP 530. In an aspect, the active DL BWP 470 may be configured with signaling to facilitate operation of a RedCap UE. For example, the active DL BWP 470 may carry periodic reference signals such as a TRS, CSI-RS, and/or PRS. The active DL BWP 470 may include a CSS for paging and wake-up signal (WUS). The active DL BWP 470 may include dedicated RRC signaling for system information updates. The active DL BWP 470 may include layer 3 intra-frequency measurement gaps for measuring neighbor cells and/or reference signals on other BWPs (e.g., the shared initial DL BWP 530). Like the active DL BWP 470, the Active DL BWP 540 may not be configured with SSBs. The RedCap UE 104 may be configured with L1 measurement gaps for measuring the CD-SSBs 532 on the shared initial DL BWP 530.

In an aspect, under the configuration 400 or the configuration 500, a RedCap UE configured with an active DL BWP 460, 540 that is not configured with an SSB, may be configured with L1 measurement gaps for measuring SSBs on other frequencies such as the shared initial DL BWP 430, 530, and/or the separate initial DL BWP 450. For simplicity, further descriptions make reference to the configuration 400, but may also be applicable to the configuration 500. In an aspect, a RedCap UE may perform L1 measurements for radio link monitoring (RLM), beam failure detection (BFD), candidate beam detection (CBD), and L1-RSRP, for example. Such L1 measurements may have a shorter periodicity and a shorter duration than L3 measurements. For instance, the SSB index for L1 measurements may be known, so the RedCap UE may be configured with an L1 measurement resource to measure a specific SSB for the SSB index.

Figure 6:
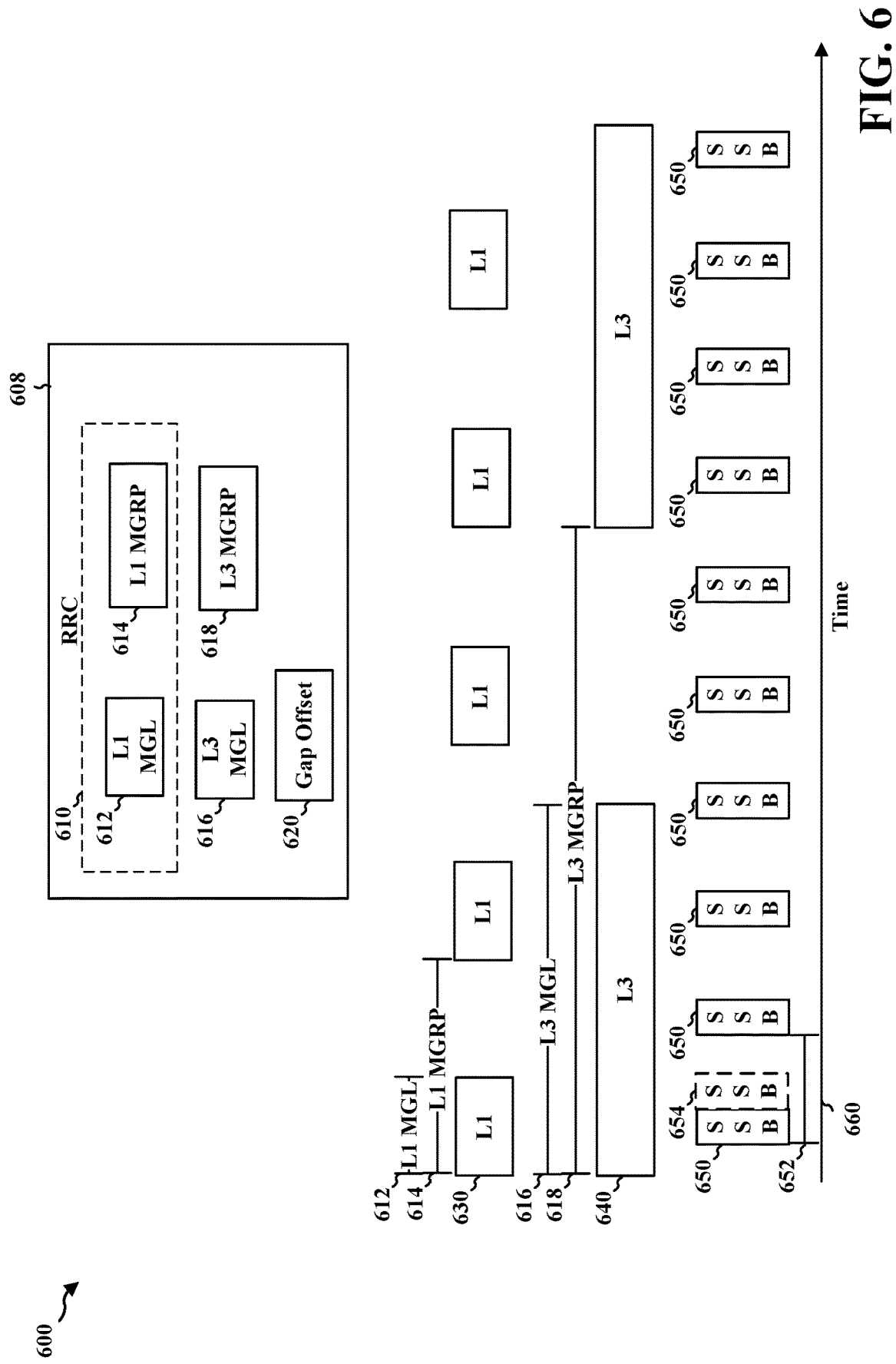
FIG. 6 is a diagram illustrating an example of a configuration of layer 1 (L1) measurement gaps.

FIG. 6 is a diagram 600 illustrating a configuration of L1 measurement gaps 630. The L1 gaps 630 may be configured to allow the UE to measure L1 measurement resources such as SSBs 650, 654. The SSBs may be transmitted in a burst with each SSB within the burst having a different SSB index. For example, the SSB 650 may have a different SSB index than the SSB 654. SSBs with different indexes may, for example, be transmitted on different beams. The SSBs may be transmitted with an SSB periodicity 652. For simplicity, only the SSB 650 is shown as repeated over time 660, but other SSBs in the burst may also be repeated.

The L1 measurement gaps 630 may be configured via an RRC message 608. The RRC message 608 may be received on the initial BWP and/or the active BWP. The RRC message 608 may include an L1 measurement gap configuration 612. For example, the L1 measurement gap configuration 612 may be an information element. The L1 measurement gap configuration 612 may include a L1 measurement gap length (MGL) 612 and a L1 measurement gap repetition period (MGRP) 614. For instance, the L1 MGL 612 and the L1 MGRP 614 may be information elements within the L1 measurement gap configuration 610. The L1 MGL 612 may be a duration of time for the UE to tune away from the active BWP. In some implementations, the L1 MGL 612 may be specified in terms of a RF retuning time, a scaling factor (K) based on a number of configured L1 measurement resources (e.g., SSBs 650, 654), and a length of a downlink slot. For instance, the L1 MGL 612 may have a minimum duration of two times the RF tuning times plus K times the length of a downlink slot. In some implementations, the L1 MGL 612 may be computed based on a known RF retuning time (e.g., 0.5 ms for FR1), known length of a downlink slot (e.g., based on sub-carrier spacing), and configured measurement resources without explicit signaling of the L1 MGL 612. Accordingly, the UE may be able to switch from the active BWP to the initial BWP, measure one or more SSBs 650, 654, and return to the active BWP within the L1 MGL 612. The L1 MGRP 614 may be based on the SSB transmission periodicity 652 of the configured measurement resource (e.g., SSBs 650). For example, the L1 MGRP 614 may be the same as the SSB transmission periodicity 652 or an integer multiple of the SSB transmission periodicity 652.

The RRC message 608, or another RRC message, may configure L3 measurement gaps 640. The L3 measurement gaps may be defined by an L3 MGL 616 and an L3 MGRP 618. In an aspect, the RRC message 608 may include a gap offset 620 that defines a timing of the L3 measurement gap with respect to system timing. In an aspect, the gap offset 620 may be selected to align the L3 measurement gaps 640 to include the L1 measurement gap 630. For example, whenever there is an overlap between the L3 measurement gap 640 and the L1 measurement gap 630, the L3 measurement gap may include the entire L1 measurement gap 630. In some implementations, an L1 measurement gap 630 may not be adjacent an L3 measurement gap 640. Accordingly, the combination of an L1 measurement gap 630 and an L3 measurement gap 640 may not extend the total tune away time longer than the L3 MGL 616.

In an aspect, L3 intra-frequency measurements may be performed concurrently with the L1 measurements. In some instances, the same SSB may be measured for both the L1 measurement and the L3 measurement, although the measurement may be filtered differently at each layer. In contrast, L3 inter-frequency and inter-RAT measurements may not be performed concurrently with the L1 measurements, but may be performed within the L3 measurement gaps 640 outside of the L1 measurement gaps 630. For instance, a gap sharing scheme may identify a percentage of L1 measurements and L3 inter measurements for determining a sharing factor (K) that affects the periodicity of the respective measurements.

A downlink radio quality assessment period may be defined based on the L1 measurement gap configuration 610. The downlink radio quality assessment period may refer to a period of time over which L1 measurements are performed or filtered. Because the L1 measurement gaps 630 may not include every measurement resource (e.g., SSBs 650) and/or may be shared with L3 measurements, the downlink radio quality assessment period may be adjusted. For instance, a multi-layer sharing factor (P) may be used to determine the downlink radio quality assessment period. P may be equal to 1 when the L1 measurement gaps 630 do not overlap with the L3 measurement gaps 640. When there are layer 3 measurement gaps 640 configured for intra-frequency, inter-frequency, or inter-RAT measurements and measurement resources configured for inter-frequency or inter-RAT measurements exist in the layer 3 measurement gaps 640, and there are L1 measurement gaps 630 configured for SSB based RLM reference signal (RLM-RS) resources and some but not all of the L1 measurement gaps 630 are overlapping with layer 3 measurement gaps 640, P may be defined according to the following equation.

$$P = \frac{1}{1 - \frac{MGRP - L1}{MGRP - L3}}$$

For example, the downlink radio quality assessment period may be a RLM out-of-sync evaluation period ($T_{Evaluate\_out\_SSB}$) or an RLM in-sync evaluation period ($T_{Evaluate\_in\_SSB}$). The RLM out-of-sync evaluation period and the RLM in-sync evaluation period may be defined by the following table, where MGRP-L1 is the periodicity of the L1 MG configured for RLM (e.g., L1 MGRP 614) and $T_{DRX}$ is the DRX cycle length.

| Configuration | $T_{Evaluate\_out\_SSB}$ (ms) | $T_{Evaluate\_in\_SSB}$ (ms) |
| --- | --- | --- |
| no DRX | Max(200, Ceil(10 × P) × MGRP-L1) | Max(100, Ceil(5 × P) × MGRP-L1) |
| DRX cycle ≤ 320 ms | Max(200, Ceil(15 × P) × Max($T_{DRX}$, MGRP-L1)) | Max(100, Ceil(7.5 × P) × Max($T_{DRX}$, MGRP-L1)) |
| DRX cycle > 320 ms | Ceil(10 × P) × $T_{DRX}$ | Ceil(5 × P) × $T_{DRX}$ |

As another example, the downlink radio quality assessment period may be an evaluation period for beam failure detection that is defined in terms of the L1 MGRP 614. The UE may evaluate whether the downlink radio link quality on the configured SSB resource in a set $\bar{q}_0$ estimated over the last $T_{Evaluate\_BFD\_SSB}$ ms period becomes worse than the threshold $Q_{out\_LR\_SSB}$ within $T_{Evaluate\_BFD\_SSB}$ ms period. The $T_{Evaluate\_BFD\_SSB}$ may be defined by the following table for FR1, where P and $T_{DRX}$ are defined as above and L1-MGRP is the L1 MGRP 614 for SSBs in the set $\bar{q}_0$.

| Configuration | $T_{Evaluate\_BFD\_SSB}$ (ms) |
| --- | --- |
| no DRX | Max(50, Ceil(5 × P) × L1-MGRP) |
| DRX cycle ≤ 320 ms | Max(50, Ceil(7.5 × P) × Max($T_{DRX}$, L1-MGRP)) |
| DRX cycle > 320 ms | Ceil(5 × P) × $T_{DRX}$ |

As another example, the downlink radio quality assessment RLM period may be a L1 indication period for BFD, and an SSB periodicity ($T_{SSB-RS,M}$) may refer to a shortest periodicity of all SSB-RS resources in the set $\bar{q}_0$ that lie in the configured L1 measurement gap 630. The L1 indication period ($T_{Indication\_interval\_BFD}$) may be the maximum of 2 and $T_{SSB-RS,M}$.

As another example, the downlink radio quality assessment period may be an evaluation period for Candidate Beam Detection (CBD) and may be defined in terms of periodicity of SSBs in a set $\bar{q}_1$ that lie in the configured L1 measurement gap. The evaluation period $T_{Evaluate\_CBD\_SSB}$ may be defined by the following table for FR1, where P and $T_{DRX}$ are defined as above and L1-MGRP is the L1 MGRP 614 for SSBs in the set $\bar{q}_1$.

| Configuration | $T_{Evaluate\_CBD\_SSB}$ (ms) |
| --- | --- |
| non-DRX, DRX cycle ≤ 320 ms | Max(25, Ceil(3 × P × $P_{CBD}$) × L1-MGRP) |
| DRX cycle > 320 ms | Ceil(3 × P × $P_{CBD}$) × $T_{DRX}$ |

In some implementations, a L1 reference signal received power (RSRP) measurement period is defined in terms of a periodicity of an SSB index that lies in the configured L1 measurement gap. The measurement period $T_{L1-RSRP\_Measurement\_Period\_SSB}$ may be defined by the following table for FR1, where L1-MGRP is the L1 MGRP 614 for the SSB-Index configured for L1-RSRP measurement, $T_{DRX}$ is the DRX cycle length, $T_{Report}$ is a configured periodicity for reporting and K is a scaling factor or high-speed scenarios.

| Configuration | $T_{L1\text{-}RSRP\_Measurement\_Period\_SSB}$ (ms) |
| --- | --- |
| non-DRX | $\max(T_{Report}, \text{ceil}(M*P)* \text{L1-MGRP})$ |
| DRX cycle ≤ 320 ms | $\max(T_{Report}, \text{ceil}(K*M*P)*\max(T_{DRX}, \text{L1-MGRP}))$ |
| DRX cycle > 320 ms | $\text{ceil}(M*P)*T_{DRX}$ |

Figure 7:
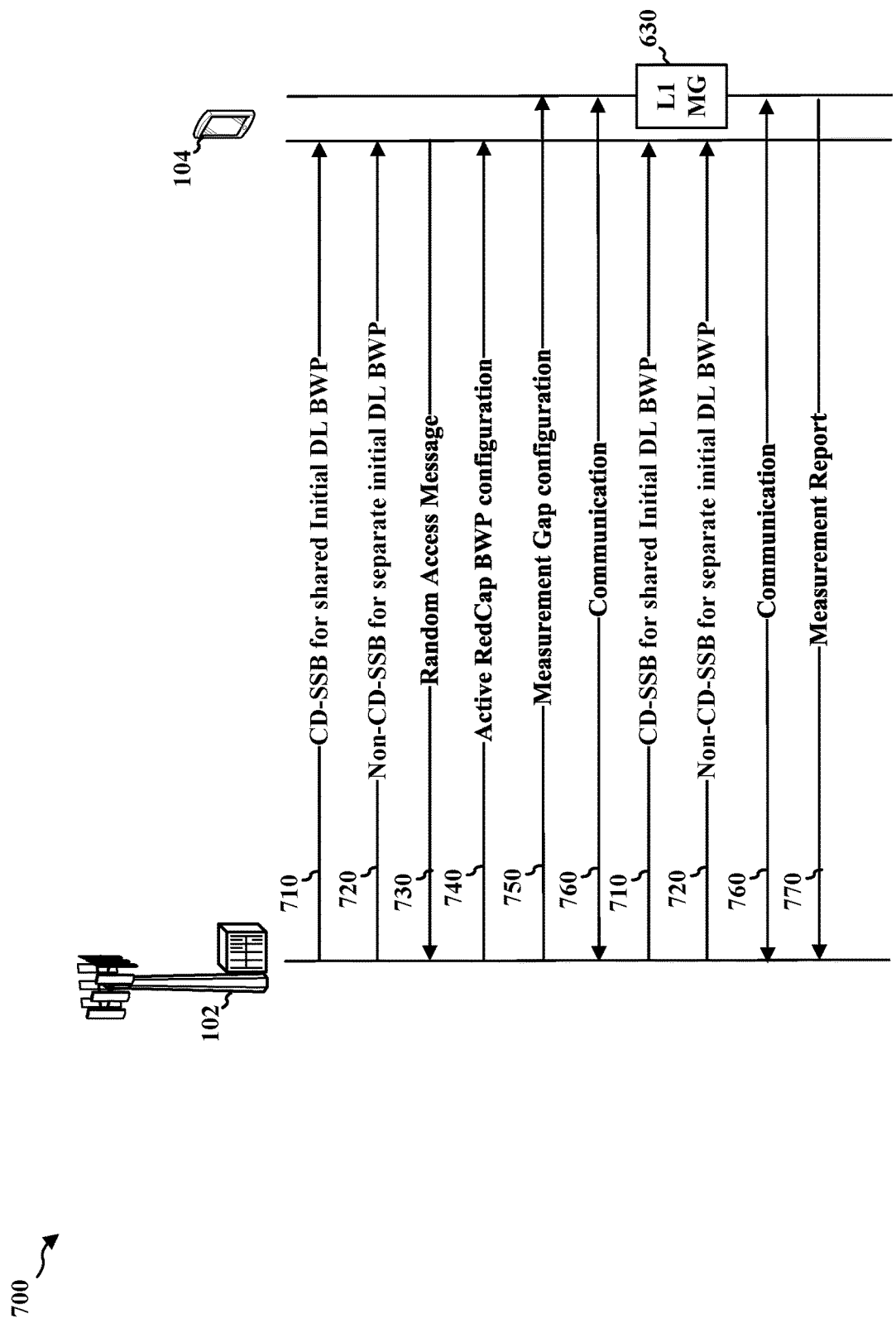
FIG. 7 is a message diagram illustrating example messages for managing layer 1 measurement gaps.

FIG. 7 is a message diagram 700 illustrating example messages between a base station 102 and a UE 104 for performing L1 measurements. The base station 102 may broadcast a CD-SSB 710 for the shared initial DL BWP 430, 530. In some implementations, the base station 102 may also broadcast a non-CD-SSB 720 for the separate DL BWP 450.

The UE 104 may transmit a random access message 730. For example, the random access message 730 may be a first random access message such as Msg1 in a 4-step random access procedure or MsgA in a 2-step random access procedure. When the cell is configured with both the shared initial DL BWP 430 and the separate initial DL BWP 450, the UE 104 may select between the CD-SSB 710 and the non-CD-SSB 720 for transmitting the first random access message. In some implementations, system information indicated by the CD-SSB 710 and/or the non-CD-SSB 720 may explicitly indicate which SSB to use. In some implementations, rules may identify a preference or ranking of the SSBs.

After the random access procedure, the base station 102 may transmit an active RedCap BWP configuration 740 for the active DL BWP 470, 550 and the active UL BWP 460, 540. For example, the active RedCap BWP configuration 740 may be an RRC configuration. In some implementations, the active RedCap BWP configuration 740 may include a measurement gap configuration 750, which may correspond to the RRC message 608. Alternatively or additionally, the measurement gap configuration 750 may be transmitted on the active DL BWP 470, 550.

The base station 102 and the UE 104 may perform communications 760 on the active DL BWP 470, 550 and the active UL BWP 460, 540. For example, the communications 760 may include communications on the PDCCH, PDSCH, PUCCH, and/or PUSCH channels.

The UE 104 may tune away from the active DL BWP 470, 550 during the L1 measurement gap 630 according to the measurement gap configuration 750 to perform L1 measurement on the CD-SSB 710 and/or the non-CD-SSB 720. The UE 104 may tune back to the active DL BWP 470, 550 after the L1 measurement gap 630. Accordingly, the base station 102 and the UE 104 may resume communications 760 on the active DL BWP 470, 550 and the active UL BWP 460, 540 after the L1 measurement gap 630.

In some implementations, the UE 104 may transmit a measurement report 770. The measurement report 770 may include L1 measurements such as an L1-RSRP. In some implementations, the measurement report 770 may be an event report for an event detected at the UE 104 based on L1 measurements.

FIG. 8 is a conceptual data flow diagram 800 illustrating the data flow between different means/components in an example base station 802, which may be an example of the base station 102 including the RedCap BWP control component 120. The RedCap BWP control component 120 may be implemented by the memory 376 and the TX processor 316, the RX processor 370, and/or the controller/processor 375 of FIG. 3. For example, the memory 376 may store executable instructions defining the RedCap BWP control component 120 and the TX processor 316, the RX processor 370, and/or the controller/processor 375 may execute the instructions.

The base station 102 may include a receiver component 870, which may include, for example, a radio frequency (RF) receiver for receiving the signals described herein. The base station 102 may include a transmitter component 872, which may include, for example, an RF transmitter for transmitting the signals described herein. In an aspect, the receiver component 870 and the transmitter component 872 may co-located in a transceiver such as illustrated by the TX/RX 318 in FIG. 3.

As discussed with respect to FIG. 1, the RedCap BWP control component 120 may include the initial BWP component 810, the active BWP component 820, and the measurement gap component 830. The RedCap BWP control component 120 may optionally include a L1 component 840.

The receiver component 870 may receive UL signals from the UE 104 including UL communications. In some implementations, the receiver component 870 may optionally receive a measurement report 770 from the UE 104 that is configured with L1 measurement gaps 630. The receiver component 870 may provide the measurement report to the L1 component 840.

The initial BWP component 810 may transmit, via transmitter component 872, CD-SSB 710 that defines the shared initial downlink BWP 430, 530 for RedCap UEs and non-RedCap UEs. For example, the CD-SSB 710 may include or identify system information. In some implementations, the initial BWP component 810 may transmit, via transmitter component 872, the non-CD-SSB 720 for a separate initial downlink BWP for RedCap UEs. For example, the non-CD-SSB 710 may include or identify system information specific for RedCap UEs. In some implementations, the system information transmitted on the separate initial downlink BWP 550 may include some or all of the system information transmitted in the CD-SSB 710.

The active BWP component 820 may receive a random access message and/or identification of a RedCap UE 104 from the receiver component 870. The active BWP component 820 may configure an active DL BWP 470, 550 and the active UL BWP 460, 540 for the RedCap UE 104. For example, the active BWP component 820 may transmit, via transmitter component 872, an RRC configuration message including a configuration of the active DL BWP 470, 550 and the active UL BWP 460, 540.

The measurement gap component 830 may receive the configuration of the active DL BWP 470, 550 and the active UL BWP 460, 540 from the active BWP component 820. The measurement gap component 830 may configure the active DL BWP 470, 550 for a UE 104 with the L1 measurement gaps 630. For example, the measurement gap component 830 may transmit the RRC message 608 including the L1 measurement gap configuration 612.

The L1 component 840 may receive the measurement report 770 via the receiver component 870. The L1 component 840 may determine whether any events have occurred based on the received L1 measurements or events reported by the UE. The L1 component 840 may report events to higher layers to respond.

Figure 9:
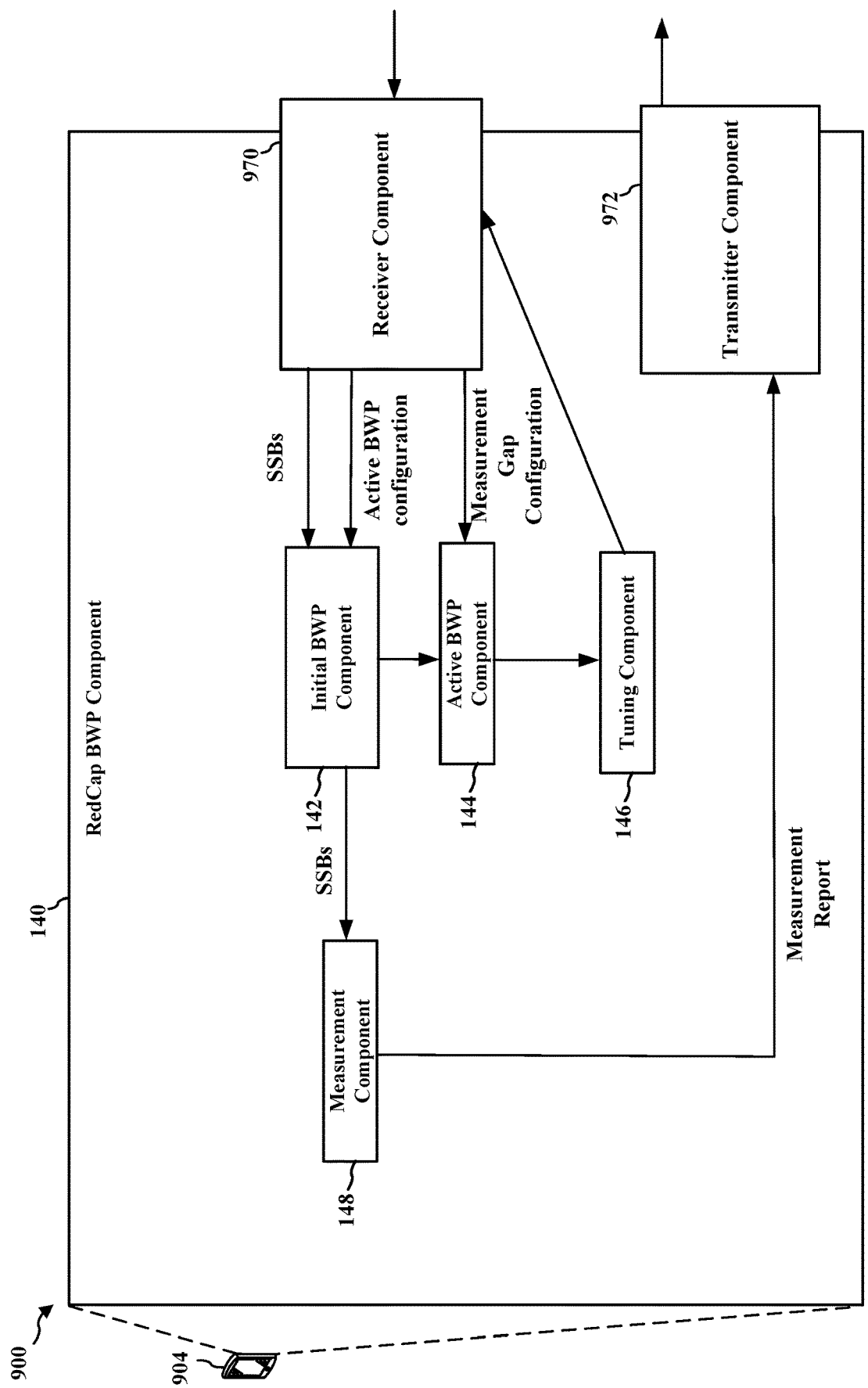
FIG. 9 is a conceptual data flow diagram illustrating the data flow between different means/components in an example UE.

FIG. 9 is a conceptual data flow diagram 900 illustrating the data flow between different means/components in an example UE 904, which may be an example of the UE 104 and include the RedCap BWP component 140. The RedCap BWP component 140 may be implemented by the memory 360 and the TX processor 368, the RX processor 356, and/or the controller/processor 359. For example, the memory 360 may store executable instructions defining the RedCap BWP component 140 and the TX processor 368, the RX processor 356, and/or the controller/processor 359 may execute the instructions.

The UE 104 may include a receiver component 970, which may include, for example, a RF receiver for receiving the signals described herein. The UE 104 may include a transmitter component 972, which may include, for example, an RF transmitter for transmitting the signals described herein. In an aspect, the receiver component 970 and the transmitter component 972 may co-located in a transceiver such as the TX/RX 352 in FIG. 3.

As discussed with respect to FIG. 1, the RedCap BWP component 140 may include the initial BWP component 142, the active BWP component 144, the tuning component 146, and the measurement component 148.

The receiver component 970 may receive DL signals described herein such as the CD-SSB 710, non-CD-SSB 720, active RedCap BWP configuration 740, measurement gap configuration 750, RRC message 608, and communications 760. The receiver component 970 may provide the CD-SSB 710 and the non-CD-SSB 720 to the initial BWP component 142. The receiver component 970 provide the active RedCap BWP configuration 740, the measurement gap configuration 750, and/or the RRC message 608 to the active BWP component 144. In some implementations, the receiver component 970 may be tuned by the tuning component 146 to receive SSBs on the initial BWP.

The initial BWP component 142 may receive the CD-SSB 710 and/or the non-CD-SSB 720 via the receiver component 970. The initial BWP component 142 may obtain system information based on the CD-SSB 710. The system information may include a location of the non-CD-SSB 720. The initial BWP component 142 may control the receiver component 970 to receive the non-CD-SSB 720. The initial BWP component 142 may receive system information for RedCap UEs based on the non-CD-SSB 720. For example, the initial BWP component 142 may determine RACH occasions on the separate initial uplink BWP 440. The initial BWP component 142 may perform a RACH procedure to access the cell. When the UE 904 is operating in a L1 measurement gap 630, the initial BWP component 142 may forward the received SSBs to the measurement component 148 for performing L1 measurements.

The active BWP component 144 may receive an active RedCap BWP configuration 740 via the receiver component 970. The active RedCap BWP configuration 740 may be in response to the random access procedure (e.g., the UE connecting to the cell). The active BWP component 144 may receive the measurement gap configuration 750 and/or the RRC message 608 via the receiver component 970. The active BWP component 144 may determine the L1 measurement gaps 630 based on the measurement gap configuration 750 and/or the RRC message 608. In some implementations, the active BWP component 144 may also determine the L3 measurement gaps 640. The active BWP component 144 may provide the L1 measurement gap configuration (and optionally the L3 measurement gaps) to the tuning component 146.

The tuning component 146 may receive the L1 measurement gap configuration from the active BWP component 144. The tuning component 146 may tune the receiver component 970, from the active DL BWP 470, 540 to the initial downlink BWP 420, 440, 530 for a L1 measurement gap 630 defined by the L1 measurement gap configuration. Accordingly, the receiver component 970 may receive the CD-SSBs 710 and/or the non-CD-SSBs 720 during the L1 measurement gap 630.

The measurement component 148 may receive the CD-SSBs 710 and/or the non-CD-SSBs 720 via the receiver component 970 and/or the initial BWP component 142. The measurement component 148 may perform a L1 measurement of the SSBs received on the initial downlink BWP during the L1 measurement gap. For example, the measurement component 148 may perform L1 measurements one or more of RLM, BFD, CBD, or measurement reporting. For instance, the measurement component 148 may measure a L1-RSRP based on the received SSBs. In some implementations, the measurement component 148 may generate a measurement report 770, which may include measurements such as the L1-RSRP or events detected based on L1 measurements such as link failure, beam failure, or a better candidate beam. The measurement component 148 may transmit the measurement report 770 via the transmitter component 972.

Figure 10:
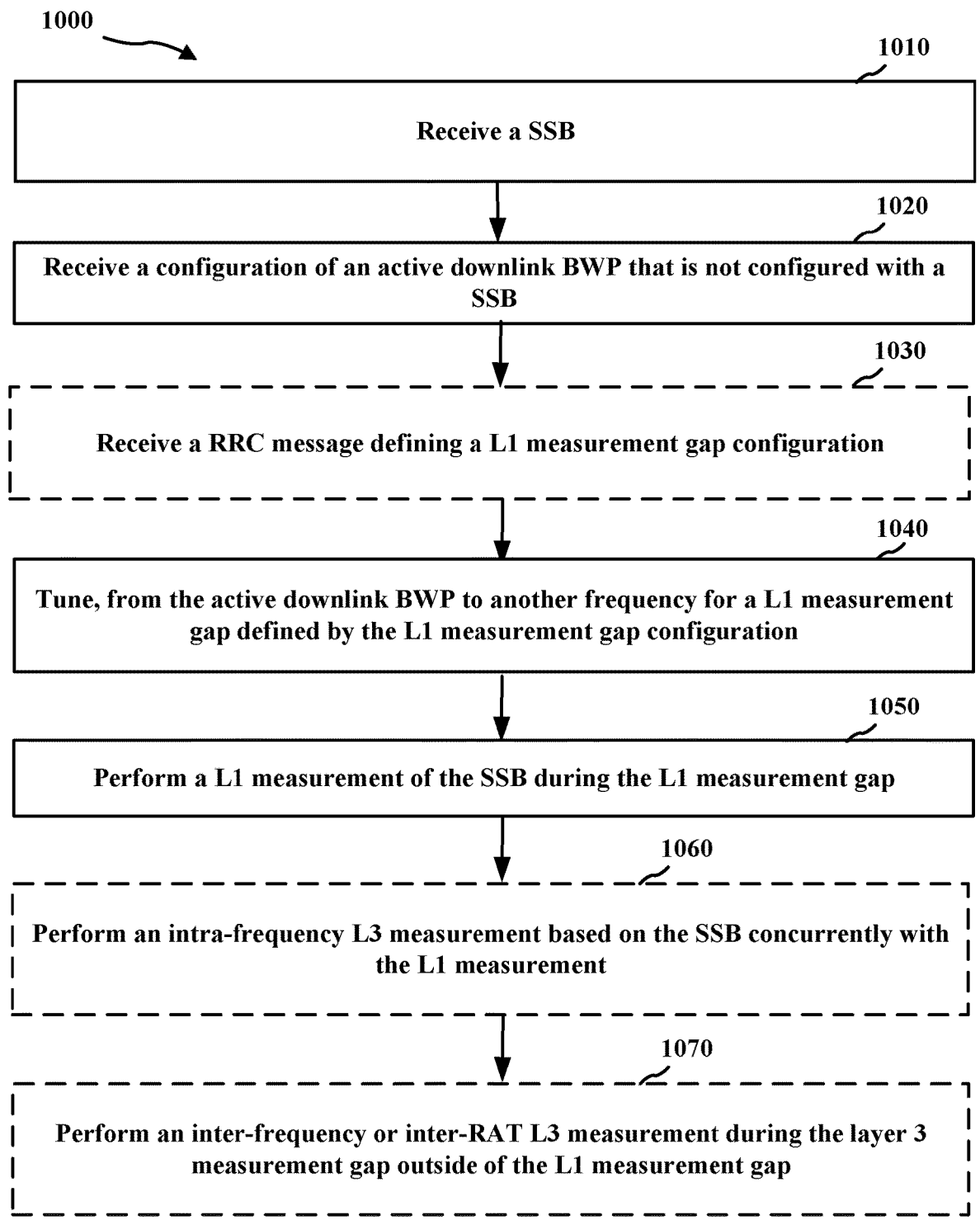
FIG. 10 is a flowchart of an example of a method for a UE to perform L1 measurements when configured with multiple BWPs.

FIG. 10 is a flowchart of an example method 1000 for a RedCap UE configured with multiple BWPs to perform L1 measurements. The method 1000 may be performed by a UE (such as the UE 104, which may include the memory 360 and which may be the entire UE 104 or a component of the UE 104 such as the RedCap BWP component 140, TX processor 368, the RX processor 356, or the controller/processor 359). The method 1000 may be performed by the RedCap BWP component 140 in communication with the RedCap BWP control component 120 of the base station 102. Optional blocks are shown with dashed lines.

At block 1010, the method 1000 may include receiving a SSB. In some implementations, for example, the UE 104, the RX processor 356 or the controller/processor 359 may execute the RedCap BWP component 140 or the initial BWP component 142 to receive the CD-SSB 720 that defines a shared initial downlink BWP 430 for RedCap UEs and non-RedCap UEs and/or the non-CD-SSB 720 that defines a RedCap initial downlink BWP. Accordingly, the UE 104, the RX processor 356, or the controller/processor 359 executing the RedCap BWP component 140 or the initial BWP component 142 may provide means for receiving.

At block 1020, the method 1000 may include receiving a configuration of an active downlink BWP that is not configured with a SSB. In some implementations, for example, the UE 104, the RX processor 356 or the controller/processor 359 may execute the RedCap BWP component 140 or the active BWP component 144 to receive a configuration 740 of an active downlink BWP 470, 550 for RedCap UEs that is not configured with a SSB. Accordingly, the UE 104, the RX processor 356, or the controller/processor 359 executing the RedCap BWP component 140 or the initial BWP component 142 may provide means for receiving a configuration of an active downlink BWP that is not configured with a SSB.

At block 1030, the method 1000 may optionally include receiving a RRC message defining a L1 measurement gap configuration. In some implementations, for example, the UE 104, the RX processor 356, or the controller/processor 359 may execute the RedCap BWP component 140 or the active BWP component 144 to receive the RRC message 608 defining the L1 measurement gap configuration 610. In some implementations, the L1 measurement gap configuration defines a L1 MGL 612 and a L1 MGRP 614. In some implementations, the MGL for the L1 measurement gap is less than a MGL of a layer 3 measurement gap. In some implementations, the MGL of the L1 measurement gap 630 is at least a number of configured L1 measurement resources times a slot length plus two times a radio-frequency tuning time. In some implementations, the MGL of the L1 measurement gap is at least a number of configured L1 measurement resources times a slot length plus two times a radio-frequency tuning time. In some implementations, the RRC message includes a gap offset that aligns a layer 3 measurement gap to include the L1 measurement gap whenever there is an overlap between the L3 measurement gap and the L1 measurement gap. Accordingly, the UE 104, the TX processor 368, or the controller/processor 359 executing the RedCap BWP component 140 or the active BWP component 144 may provide means for receiving a RRC message defining a L1 measurement gap configuration.

At block 1040, the method 1000 may include tuning, from the active downlink BWP to another frequency for a L1 measurement gap defined by the L1 measurement gap configuration. In some implementations, for example, the UE 104, the RX processor 356, or the controller/processor 359 may execute the RedCap BWP component 140 or the tuning component 146 to tune, from the active downlink BWP 470, 550 for RedCap UEs to another frequency (e.g., the initial downlink BWP 420, 450, 530) for a L1 measurement gap defined by the L1 measurement gap configuration 610. Accordingly, the UE 104, the RX processor 356, or the controller/processor 359 executing the RedCap BWP component 140 or the tuning component 146 may provide means for tuning, from the active downlink BWP to another frequency for a L1 measurement gap defined by the L1 measurement gap configuration.

At block 1050, the method 1000 may include performing a L1 measurement of the SSB during the L1 measurement gap. In some implementations, for example, the UE 104, the RX processor 356, or the controller/processor 359 may execute the RedCap BWP component 140 or the measurement component 148 to perform the L1 measurement of the SSB 650, 710, 720 (e.g., on the initial downlink BWP 420, 450, 530) during the L1 measurement gap 630. In some implementations, a downlink radio quality assessment period is defined based on the L1 measurement gap configuration. For example, the downlink radio quality assessment period may be defined based on a multi-layer sharing factor (P) when there are layer 3 measurement gaps configured for intra-frequency, inter-frequency, or inter-RAT measurements and measurement resources configured for inter-frequency or inter-RAT measurements exist in the layer 3 measurement gaps, and there are L1 measurement gaps configured for SSB based RLM-RS resources and some but not all of the L1 measurement gaps are overlapping with layer 3 measurement gaps. For instance, the downlink radio quality assessment period may be an RLM out-of-sync evaluation period, an RLM in-sync evaluation period, an evaluation period for beam failure detection that is defined in terms of the L1 MGRP, a L1 indication period for BFD, or an evaluation period for CBD, or a L1 RSRP measurement period. Accordingly, the UE 104, the RX processor 356, the TX processor 368, or the controller/processor 359 executing the RedCap BWP component 140 or the measurement component 148 may provide means for performing a L1 measurement of the SSB during the L1 measurement gap.

In some implementations, at block 1060, the method 1000 may optionally include performing an intra-frequency L3 measurement based on the SSB 650 concurrently with the L1 measurement. In some implementations, at block 1070, the method 1000 may optionally include performing an inter-frequency or inter-RAT L3 measurement during the L3 measurement gap 640 outside of the L1 measurement gap 630. For example, the UE 104, the RX processor 356, or the controller/processor 359 may execute the RedCap BWP component 140 or the measurement component 148 to perform the L3 measurements. Accordingly, the UE 104, the RX processor 356, the TX processor 368, or the controller/processor 359 executing the RedCap BWP component 140 or the measurement component 148 may also provide means for performing L3 measurements.

Figure 11:
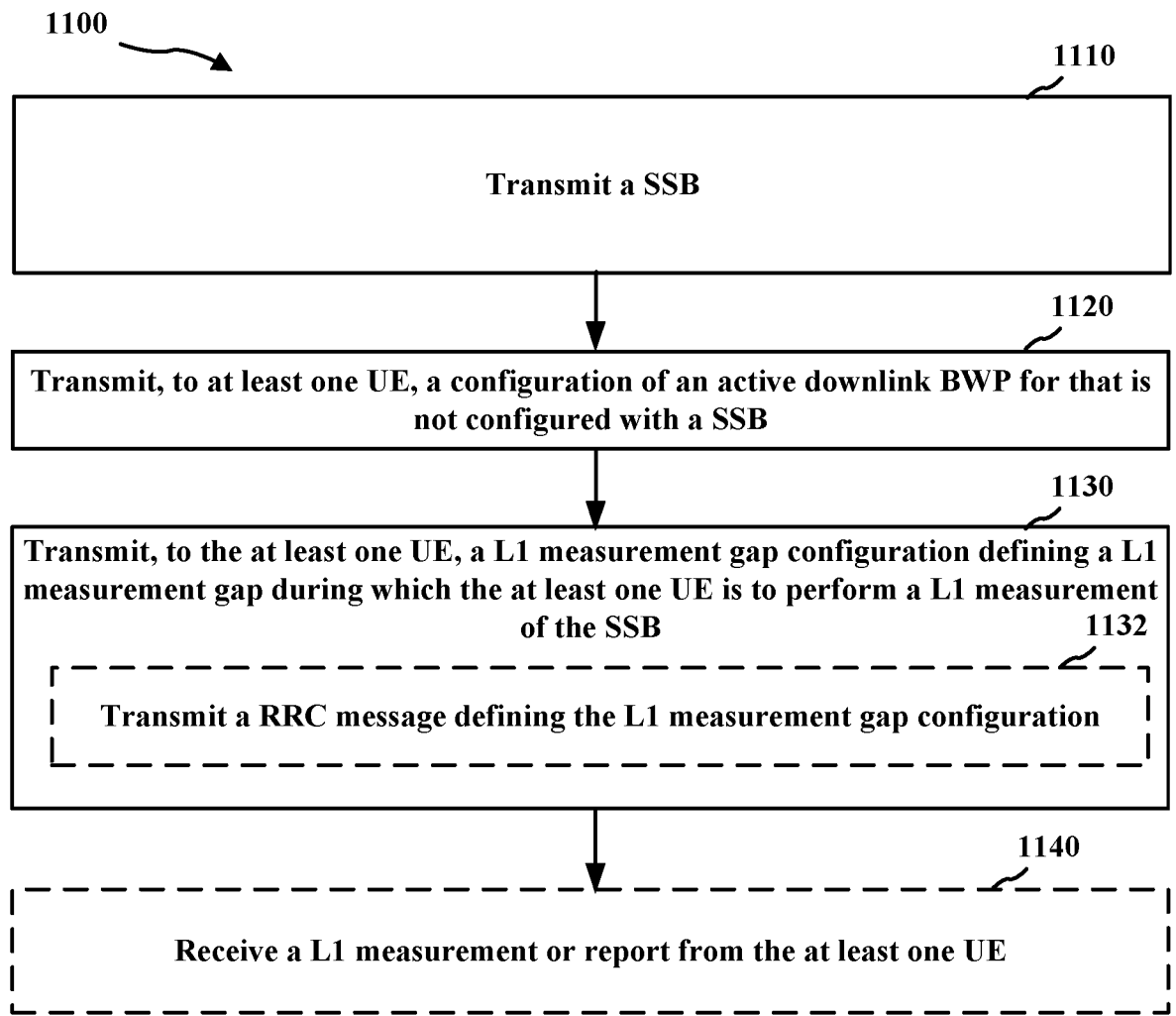
FIG. 11 is a flowchart of an example method for a BS to support L1 measurements for a RedCap UE with multiple BWPs.

FIG. 11 is a flowchart of an example method 1100 for a base station to control multiple BWPs for a UE. The method 1100 may be performed by a base station (such as the base station 102, which may include the memory 376 and which may be the entire base station 102 or a component of the base station 102 such as the RedCap BWP control component 120, the TX processor 316, the RX processor 370, or the controller/processor 375). The method 1100 may be performed by the RedCap BWP control component 120 in communication with the RedCap BWP component 140 of the UE 104.

At block 1110, the method 1100 may include transmitting a SSB. In some implementations, for example, the base station 102, the TX processor 316, or the controller/processor 375 may execute the RedCap BWP control component 120 or the initial BWP component 810 to transmit a SSB 650 (e.g., CD-SSB 710 or non-CD-SSB 720) for RedCap UEs and non-RedCap UEs. In some implementations, the SSB 650 may define an initial downlink BWP 420, 450, 530. Accordingly, the base station 102, the TX processor 316, or the controller/processor 375 executing the RedCap BWP control component 120 or the initial BWP component 810 may provide means for transmitting a SSB that defines an initial downlink BWP for RedCap UEs and non-RedCap UEs.

At block 1120, the method 1100 may include transmitting, to at least one UE, a configuration of an active downlink BWP that is not configured with a SSB. In some implementations, for example, base station 102, the TX processor 316, or the controller/processor 375 may execute the RedCap BWP control component 120 or the active BWP component 820 to transmit, to at least one RedCap UE, a configuration 740 of an active downlink BWP for RedCap UEs that is not configured with a SSB. Accordingly, the base station 102, the TX processor 316, or the controller/processor 375 executing the RedCap BWP control component 120 or the active BWP component 820 may provide means for transmitting, to at least one UE, a configuration of an active downlink BWP that is not configured with a SSB.

At block 1130, the method 1100 may include transmitting, to the at least one UE, a L1 measurement gap configuration defining a L1 measurement gap during which the at least one UE is to perform a L1 measurement of the SSB. In some implementations, for example, the base station 102, the RX processor 370, or the controller/processor 375 may execute the RedCap BWP control component 120 or the measurement gap component 830 to transmit, to the at least one UE, a L1 measurement gap configuration 610 defining a L1 measurement gap 630 during which the at least one RedCap UE is to perform a L1 measurement of the SSB. In some implementations, the measurement of the SSB may be on an initial BWP (e.g. BWP 420). For example, at sub-block 1132, the block 1130 may include transmitting an RRC message 608 defining the L1 measurement gap configuration 610. In some implementations, the L1 measurement gap configuration defines a MGL and a MGRP. In some implementations, the MGL for the L1 measurement gap is less than a MGL of a layer 3 measurement gap. In some implementations, the MGL of the L1 measurement gap 630 is at least a number of configured L1 measurement resources times a slot length plus two times a radio-frequency tuning time. In some implementations, the MGL of the L1 measurement gap is at least a number of configured L1 measurement resources times a slot length plus two times a radio-frequency tuning time. In some implementations, the RRC message includes a gap offset that aligns a layer 3 measurement gap to include the L1 measurement gap whenever there is an overlap between the L3 measurement gap and the L1 measurement gap. Accordingly, the base station 102, the RX processor 370, or the controller/processor 375 executing the RedCap BWP control component 120 or the measurement gap component 830 may provide means for transmitting, to the at least one UE, a L1 measurement gap configuration defining a L1 measurement gap during which the at least one UE is to perform a L1 measurement of the SSB.

At block 1140, the method 1100 may optionally include receiving a L1 measurement or report from the at least one UE. In some implementations, for example, base station 102, the RX processor 370, or the controller/processor 375 may execute the RedCap BWP control component 120 or the L1 component 840 to receive a L1 measurement or report from the at least one UE. Accordingly, the base station 102, the RX processor 370, or the controller/processor 375 executing the RedCap BWP control component 120 or the L1 component 840 may provide means for receiving a L1 measurement or report from the at least one UE.

The following numbered clauses provide an overview of aspects of the present disclosure:

1. A method comprising, at a user equipment (UE):
   receiving a synchronization signal block (SSB);
   receiving a configuration of an active downlink bandwidth part (BWP) that is not configured with a SSB;
   tuning, from the active downlink BWP to a different frequency for a layer 1 (L1) measurement gap defined by a L1 measurement gap configuration; and
   performing a L1 measurement of the SSB on the different frequency during the L1 measurement gap.
2. The method of clause 1, wherein the L1 measurement gap configuration defines a measurement gap length (MGL) and a measurement gap repetition period (MGRP).
3. The method of clause 2, wherein the MGL for the L1 measurement gap is less than a MGL of a layer 3 measurement gap.
4. The method of clause 2 or 3, wherein the MGL of the L1 measurement gap is at least a number of configured L1 measurement resources times a slot length plus two times a radio-frequency tuning time.
5. The method of any of clauses 2-4, wherein the MGRP is an integer multiple of a transmission period of the SSB.
6. The method of any of clauses 1-5, further comprising receiving a radio resource control (RRC) message defining the L1 measurement gap configuration.
7. The method of clause 6, wherein the RRC message includes a gap offset that aligns a layer 3 (L3) measurement gap to include the L1 measurement gap whenever there is an overlap between the L3 measurement gap and the L1 measurement gap.
8. The method of clause 7, further comprising performing an intra-frequency L3 measurement based on the SSB concurrently with the L1 measurement.
9. The method of clause 7, further comprising performing an inter-frequency or inter-RAT L3 measurement during the layer 3 measurement gap outside of the L1 measurement gap.
10. The method of any of clauses 2-9, wherein a downlink radio quality assessment period is defined based on the L1 measurement gap configuration.
11. The method of clause 10, wherein the downlink radio quality assessment period is defined based on a multi-layer sharing factor (P) when there are L3 measurement gaps configured for intra-frequency, inter-frequency, or inter-RAT measurements and measurement resources configured for inter-frequency or inter-RAT measurements exist in the L3 measurement gaps, and there are L1 measurement gaps configured for SSB based RLM reference signal (RLM-RS) resources and some but not all of the L1 measurement gaps are overlapping with layer 3 measurement gaps.
12. The method of clause 10, wherein the downlink radio quality assessment period is an RLM out-of-sync evaluation period or an RLM in-sync evaluation period.
13. The method of clause 10, wherein the downlink radio quality assessment period is an evaluation period for beam failure detection that is defined in terms of the L1 MGRP.
14. The method of clause 10, wherein the downlink radio quality assessment period is a L1 indication period for Beam Failure Detection (BFD), and an SSB periodicity (TSSB-RS,M) refers to a shortest periodicity of all SSB-RS resources in a set $\bar{q}_0$ that lie in the configured L1 measurement gap.
15. The method of clause 10, wherein the downlink radio quality assessment period is an evaluation period for Candidate Beam Detection (CBD) and is defined in terms of periodicity of SSBs in a set q1 that lie in the configured L1 measurement gap.
16. The method of any of clauses 1-15, wherein a L1 reference signal received power (RSRP) measurement period is defined in terms of a periodicity of an SSB index that lies in the configured L1 measurement gap.
17. The method of any of clauses 1-16, wherein the UE is a reduced capability (RedCap) UE, the active BWP is for RedCap UEs, and the SSB is for RedCap UEs and non-RedCap UEs.
18. The method of clause 17, wherein the SSB defines an initial BWP for the RedCap UEs and the non-RedCap UEs, and wherein the different frequency is the initial BWP.
19. A method comprising, at a base station:
   transmitting a synchronization signal block (SSB);
   transmitting, to at least one user equipment (UE), a configuration of an active downlink BWP that is not configured with a SSB; and
   transmitting, to the at least one UE, a layer 1 (L1) measurement gap configuration defining a L1 measurement gap during which the at least one UE is to perform a L1 measurement of the SSB on a different frequency than the active downlink BWP.
20. The method of clause 19, wherein the L1 measurement gap configuration defines a measurement gap length (MGL) and a measurement gap repetition period (MGRP).
21. The method of clause 20, wherein the MGL for the L1 measurement gap is less than a MGL of a layer 3 (L3) measurement gap.
22. The method of clause 20 or 21, wherein the MGL of the L1 measurement gap is at least a number of configured L1 measurement resources times a slot length plus two times a radio-frequency tuning time.
23. The method of any of clauses 20-22, wherein the MGRP is an integer multiple of a transmission period of the SSB.
24. The method of any of clauses 19-23, wherein transmitting the L1 measurement gap configuration comprises transmitting a radio resource control (RRC) message defining the L1 measurement gap configuration.

25. The method of clause 24, wherein the RRC message includes a gap offset that aligns a L3 measurement gap to include the L1 measurement gap.

26. The method of any of clauses 20-35, wherein a radio link measurement (RLM) period is defined based on the L1 measurement gap configuration.

27. The method of clause 26, wherein the RLM period is defined based on a multi-layer sharing factor (P) when there are L3 measurement gaps configured for intra-frequency, inter-frequency or inter-RAT measurements and measurement resources configured for inter-frequency or inter-RAT measurements exist in the L3 measurement gaps, and there are L1 measurement gaps configured for SSB based RLM reference signal (RLM-RS) resources and the L1 measurement gaps are overlapping with some but not all L3 measurement gaps.

28. The method of clause 26, wherein the RLM period is an RLM out-of-sync evaluation period or an RLM in-sync evaluation period.

29. The method of clause 26, wherein the RLM period is an evaluation period for beam failure detection that is defined in terms of the L1 MGRP.

30. The method of clause 26, wherein the RLM period is a L1 indication period for Beam Failure Detection (BFD), and an SSB periodicity (TSSB-RS,M) refers to a shortest periodicity of all SSB-RS resources in a set q0 that lie in the configured L1 measurement gap.

31. The method of clause 26, wherein the RLM period is an evaluation period for Candidate Beam Detection (CBD) and is defined in terms of periodicity of SSBs in a set q1 that lie in the configured L1 measurement gap.

32. The method of any of clauses 19-31, wherein a L1 reference signal received power (RSRP) measurement period is defined in terms of a periodicity of an SSB index that lies in the configured L1 measurement gap.

33. The method of any of clauses 19-32, wherein the UE is a reduced capability (RedCap) UE, the active BWP is for RedCap UEs, and the SSB is for RedCap UEs and non-RedCap UEs.

34. The method of clause 33, wherein the SSB defines an initial BWP for the RedCap UEs and the non-RedCap UEs, and wherein the different frequency is the initial BWP.

35. An apparatus for wireless communication, comprising:
a transceiver;
a memory storing computer-executable instructions; and
a processor coupled with the transceiver and the memory and configured to execute the computer-executable instructions to perform the method of any of clauses 1-18.

36. An apparatus for wireless communication, comprising:
means for performing the method of any of clauses 1-18.

37. A non-transitory computer-readable medium storing computer executable code, the code when executed by a processor causes the processor to perform the method of any of clauses 1-18.

38. An apparatus for wireless communication, comprising:
a transceiver;
a memory storing computer-executable instructions; and
a processor coupled with the transceiver and the memory and configured to execute the computer-executable instructions to perform the method of any of clauses 19-33.

39. An apparatus for wireless communication, comprising:
means for performing the method of any of clauses 19-33.

40. A non-transitory computer-readable medium storing computer executable code, the code when executed by a processor causes the processor to perform the method of any of clauses 19-33.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, i.e., one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a sub combination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted can be incorporated in the example processes that are schematically illustrated. For example, one or more additional operations can be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

What is claimed is:

1. A method comprising, at a user equipment (UE):
receiving a synchronization signal block (SSB);
receiving a configuration of an active downlink bandwidth part (BWP) that is not configured with a SSB;
tuning, from the active downlink BWP to a different frequency for a layer 1 (L1) measurement gap defined by a L1 measurement gap configuration; and
performing a L1 measurement of the SSB on the different frequency during the L1 measurement gap.

2. The method of claim 1, wherein the L1 measurement gap configuration defines a measurement gap length (MGL) and a measurement gap repetition period (MGRP).

3. The method of claim 2, wherein the MGL for the L1 measurement gap is less than a MGL of a layer 3 measurement gap.

4. The method of claim 2, wherein the MGL of the L1 measurement gap is at least a number of configured L1 measurement resources times a slot length plus two times a radio-frequency tuning time.

5. The method of claim 2, wherein the MGRP is an integer multiple of a transmission period of the SSB.

6. The method of claim 1, further comprising receiving a radio resource control (RRC) message defining the L1 measurement gap configuration, wherein the RRC message includes a gap offset that aligns a layer 3 (L3) measurement gap to include the L1 measurement gap whenever there is an overlap between the L3 measurement gap and the L1 measurement gap.

7. The method of claim 6, further comprising performing an intra-frequency L3 measurement based on the SSB concurrently with the L1 measurement.

8. The method of claim 6, further comprising performing an inter-frequency or inter-RAT L3 measurement during the layer 3 measurement gap outside of the L1 measurement gap.

9. The method of claim 1, wherein a downlink radio quality assessment period is defined based on the L1 measurement gap configuration.

10. The method of claim 9, wherein the downlink radio quality assessment period is defined based on a multi-layer sharing factor (P) when there are L3 measurement gaps configured for intra-frequency, inter-frequency, or inter-RAT measurements and measurement resources configured for inter-frequency or inter-RAT measurements exist in the L3 measurement gaps, and there are L1 measurement gaps configured for SSB based RLM reference signal (RLM-RS) resources and some but not all of the L1 measurement gaps are overlapping with layer 3 measurement gaps.

11. The method of claim 9, wherein the downlink radio quality assessment period is one of:
an RLM out-of-sync evaluation period;
an RLM in-sync evaluation period;
an evaluation period for beam failure detection that is defined in terms of a L1 MGRP;
a L1 indication period for Beam Failure Detection (BFD) where an SSB periodicity ($T_{SSB-RS,M}$) refers to a shortest periodicity of all SSB-RS resources in a set $\bar{q}_0$ that lie in the configured L1 measurement gap; or
an evaluation period for Candidate Beam Detection (CBD) that is defined in terms of periodicity of SSBs in a set q1 that lie in the configured L1 measurement gap.

12. The method of claim 1, wherein a L1 reference signal received power (RSRP) measurement period is defined in terms of a periodicity of an SSB index that lies in the configured L1 measurement gap.

13. The method of claim 1, wherein the UE is a reduced capability (RedCap) UE, the active BWP is for RedCap UEs, and the SSB is for RedCap UEs and non-RedCap UEs.

14. The method of claim 13, wherein the SSB defines an initial BWP for the RedCap UEs and the non-RedCap UEs, and wherein the different frequency is the initial BWP.

15. A method comprising, at a base station:
transmitting a synchronization signal block (SSB);
transmitting, to at least one user equipment (UE), a configuration of an active downlink BWP that is not configured with a SSB; and transmitting, to the at least one UE, a layer 1 (L1) measurement gap configuration defining a L1 measurement gap during which the at least one UE is to perform a L1 measurement of the SSB on a different frequency than the active downlink BWP.

16. The method of claim 15, wherein the L1 measurement gap configuration defines a measurement gap length (MGL) and a measurement gap repetition period (MGRP).

17. The method of claim 16, wherein the MGL for the L1 measurement gap is less than a MGL of a layer 3 (L3) measurement gap.

18. The method of claim 16, wherein the MGL of the L1 measurement gap is at least a number of configured L1 measurement resources times a slot length plus two times a radio-frequency tuning time.

19. The method of claim 16, wherein the MGRP is an integer multiple of a transmission period of the SSB.

20. The method of claim 16, wherein transmitting the L1 measurement gap configuration comprises transmitting a radio resource control (RRC) message defining the L1 measurement gap configuration, wherein the RRC message includes a gap offset that aligns a L3 measurement gap to include the L1 measurement gap.

21. The method of claim 15, wherein a radio link measurement (RLM) period is defined based on the L1 measurement gap configuration.

22. The method of claim 21, wherein the RLM period is defined based on a multi-layer sharing factor (P) when there are L3 measurement gaps configured for intra-frequency, inter-frequency or inter-RAT measurements and measurement resources configured for inter-frequency or inter-RAT measurements exist in the L3 measurement gaps, and there are L1 measurement gaps configured for SSB based RLM reference signal (RLM-RS) resources and the L1 measurement gaps are overlapping with some but not all L3 measurement gaps.

23. The method of claim 21, wherein the RLM period is one of:
an RLM out-of-sync evaluation period;
an RLM in-sync evaluation period;
an evaluation period for beam failure detection that is defined in terms of an L1 MGRP;
a L1 indication period for Beam Failure Detection (BFD) where an SSB periodicity (TSSB-RS,M) refers to a shortest periodicity of all SSB-RS resources in a set q0 that lie in the configured L1 measurement gap; or
an evaluation period for Candidate Beam Detection (CBD) that is defined in terms of periodicity of SSBs in a set q1 that lie in the configured L1 measurement gap.

24. The method of claim 15, wherein a L1 reference signal received power (RSRP) measurement period is defined in terms of a periodicity of an SSB index that lies in the configured L1 measurement gap.

25. The method of claim 15, wherein the at least one UE is a reduced capability (RedCap) UE, the active BWP is for RedCap UEs, and the SSB is for RedCap UEs and non-RedCap UEs.

26. An apparatus for wireless communication, comprising:
a transceiver;
a memory storing computer-executable instructions; and
a processor coupled with the transceiver and the memory and configured to:
execute the computer-executable instructions to:
receive a synchronization signal block (SSB);
receive a configuration of an active downlink bandwidth part (BWP) that is not configured with an SSB;
tune, from the active downlink BWP to a different frequency for a layer 1 (L1) measurement gap defined by a L1 measurement gap configuration; and
perform a L1 measurement of the SSB on the different frequency during the L1 measurement gap.

27. The apparatus of claim 26, wherein the L1 measurement gap configuration defines a measurement gap length (MGL) and a measurement gap repetition period (MGRP).

28. The apparatus of claim 26, wherein the processor is configured to execute the instructions to:
receive a radio resource control (RRC) message defining the L1 measurement gap configuration, wherein the RRC message includes a gap offset that aligns a layer 3 (L3) measurement gap to include the L1 measurement gap whenever there is an overlap between the L3 measurement gap and the L1 measurement gap; and
perform an intra-frequency L3 measurement based on the SSB concurrently with the L1 measurement.

29. The apparatus of claim 26, wherein the apparatus is a reduced capability (RedCap) UE, the active BWP is for RedCap UEs, and the SSB defines an initial BWP for the RedCap UEs and non-RedCap UEs, and wherein the different frequency is the initial BWP.

30. An apparatus for wireless communication, comprising:
a transceiver;
a memory storing computer-executable instructions; and
a processor coupled with the transceiver and the memory and configured to execute the computer-executable instructions to:
transmit a synchronization signal block (SSB);
transmit, to at least one UE, a configuration of an active downlink BWP for UEs that is not configured with a SSB; and
transmit, to the at least one UE, a layer 1 (L1) measurement gap configuration defining a L1 measurement gap during which the at least one UE is to perform a L1 measurement of the SSB on a different frequency than the active downlink BWP.

* * * * *